United States Patent
Han

(10) Patent No.: US 9,998,612 B2
(45) Date of Patent: Jun. 12, 2018

(54) IMAGE FORMING APPARATUS AND METHOD FOR NOTIFICATION OF LOCATION

(71) Applicant: S-PRINTING SOLUTION CO., LTD., Suwon-si, Gyeonggi-do (KR)

(72) Inventor: Dong-hyeop Han, Yongin-si (KR)

(73) Assignee: S-PRINTING SOLUTION CO., LTD., Suwon-si (KR)

( * ) Notice: Subject to any disclaimer, the term of this patent is extended or adjusted under 35 U.S.C. 154(b) by 0 days. days.

(21) Appl. No.: 15/188,368

(22) Filed: Jun. 21, 2016

(65) Prior Publication Data

US 2017/0187890 A1 Jun. 29, 2017

(30) Foreign Application Priority Data

Dec. 24, 2015 (KR) .................... 10-2015-0186456

(51) Int. Cl.
*G06F 3/12* (2006.01)
*H04N 1/00* (2006.01)
*H04N 1/32* (2006.01)

(52) U.S. Cl.
CPC ....... *H04N 1/00074* (2013.01); *G06F 3/1204* (2013.01); *G06F 3/1229* (2013.01); *G06F 3/1231* (2013.01); *G06F 3/1285* (2013.01); *G06F 3/1292* (2013.01); *H04N 1/00037* (2013.01); *H04N 1/32101* (2013.01); *H04N 2201/0094* (2013.01)

(58) Field of Classification Search
CPC combination set(s) only.
See application file for complete search history.

(56) References Cited

U.S. PATENT DOCUMENTS

| 7,092,943 | B2 * | 8/2006 | Roese | ...................... G01S 5/02 |
| 7,256,900 | B1 * | 8/2007 | Hanaoka | ............... G06F 3/1204 |
| | | | | 358/1.12 |
| 7,707,274 | B2 | 4/2010 | Umehara et al. | |
| 8,488,148 | B2 * | 7/2013 | Shirai | ................... G06F 3/1207 |
| | | | | 358/1.14 |
| 8,605,318 | B2 | 12/2013 | Ikeda | |
| 9,128,644 | B2 | 9/2015 | Kamei et al. | |

(Continued)

FOREIGN PATENT DOCUMENTS

EP 2927801 10/2015
JP 2002-259089 9/2002

(Continued)

OTHER PUBLICATIONS

Extended European Search Report dated May 3, 2017 in European Patent Application No. 16178873.2.

*Primary Examiner* — Barbara Reinier
(74) *Attorney, Agent, or Firm* — Staas & Halsey LLP

(57) ABSTRACT

An image forming apparatus includes a communicator which receives a printing data from a printing control terminal, an image former which prints the received printing data, and a processor which determines location change of the image forming apparatus by using at least one of power status of the image forming apparatus and access point information of the access points that can be connected, and controls the communicator to notify the location change to the printing control terminal when the location of the image forming apparatus is determined to be changed.

19 Claims, 21 Drawing Sheets

(56) References Cited

U.S. PATENT DOCUMENTS

| | | | |
|---|---|---|---|
| 9,883,077 B2 * | 1/2018 | Han | ............... H04N 1/4406 |
| 2006/0126585 A1 | 6/2006 | Kim | |
| 2008/0151292 A1 | 6/2008 | Shirai | |
| 2008/0297832 A1 | 12/2008 | Otsuka | |
| 2012/0050794 A1 | 3/2012 | Ikeda | |
| 2013/0057910 A1 * | 3/2013 | Matsumoto | ......... G06K 15/402 |
| | | | 358/1.15 |
| 2015/0277809 A1 | 10/2015 | Kim | |
| 2016/0255160 A1 * | 9/2016 | Pinney | ............... H04L 67/18 |

FOREIGN PATENT DOCUMENTS

| | | |
|---|---|---|
| JP | 2004-72599 | 3/2004 |
| JP | 2004-328276 | 11/2004 |
| JP | 2007-157077 | 6/2007 |
| JP | 2007-249946 | 9/2007 |
| JP | 2007-304981 | 11/2007 |
| JP | 2007-310471 | 11/2007 |
| JP | 2009-223791 | 10/2009 |
| JP | 2011-65508 | 3/2011 |
| JP | 2011-175588 | 9/2011 |
| JP | 2012-48581 | 3/2012 |
| JP | 2012-138072 | 7/2012 |
| JP | 2012-235242 | 11/2012 |
| JP | 2013-54510 | 3/2013 |
| JP | 2013-61907 | 4/2013 |
| KR | 10-0574501 | 4/2006 |
| KR | 10-0621106 | 9/2006 |
| KR | 10-2006-0122522 | 11/2006 |
| KR | 10-2015-0114190 | 10/2015 |

* cited by examiner

IMAGE FORMING APPARATUS AND METHOD FOR NOTIFICATION OF LOCATION

CROSS-REFERENCE TO RELATED APPLICATIONS

This application claims priority from Korean Patent Application No. 10-2015-0186456, filed on Dec. 24, 2015 in the Korean Intellectual Property Office, the disclosure of which is incorporated herein by reference in its entirety.

BACKGROUND

1. Field of the Invention

Apparatuses and methods consistent with what is disclosed herein relate to an image forming apparatus and a method for notification of a location, and more specifically, to an image forming apparatus configured to notify a changed location to a printing control apparatus when a location of the image forming apparatus is changed and a method for the notification of the location.

2. Description of the Related Art

An image forming apparatus usually refers to an apparatus which prints the printing data generated at a terminal such as a computer on a recording paper. Examples of the image forming apparatus may include a copy machine, a printer, a facsimile, or a multi-function peripheral (MFP) in which the above functions are combined and implemented on one apparatus.

In an environment such as public office or commercial office where many image forming apparatuses are networked, a user may select an image forming apparatus to perform a printing job and transmit the printing data to the selected image forming apparatus for execution of the printing job.

In such case, a user may make the selection described above by remembering a name of the image forming apparatus that he or she frequently uses, or by setting the frequently-used image forming apparatus as a default printer.

Meanwhile, the image forming apparatus may be moved to a different location as need arises, and depending on cases, it may be moved to a different floor or space. The user can still execute the printing job on the moved image forming apparatus as he or she previously has done without having to go through separate setting process, as long as the image forming apparatus has not been moved to a different network.

However, in a related art, a user has inconvenience of having to find the moved image forming apparatus in order to get the printed materials because he or she has not been notified of the fact that the image forming apparatus was moved. Further, when the corresponding image forming apparatus has been moved to a different floor or building, the printed materials will be more difficult to find. Further, when the printed materials are the matter that requires security, security problem may occur.

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

According to an embodiment, a technical objective is to provide an image forming apparatus which can notify a changed location to a printing control terminal when a location of an image forming apparatus is changed, and a method for notification of the location.

In order to achieve the objects mentioned above, an image forming apparatus according to an embodiment may include a communicator configured to receive a printing data from a printing control terminal, an image former configured to print the received printing data, and a processor configured to determine location change of the image forming apparatus by using at least one of power status of the image forming apparatus and access point information of access points that can be connected, and control the communicator to notify the location change to the printing control terminal when the location of the image forming apparatus is determined to be changed.

The image forming apparatus may additionally include a user operator configured to receive the location of the image forming apparatus when the power status of the image forming apparatus is changed from off state to on state, and the processor may determine the location change of the image forming apparatus by using the inputted location and a previously-stored location.

The image forming apparatus may additionally include a display configured to display map information of a space in which the image forming apparatus is located, and a user operator configured for setting of an area where the image forming apparatus is located based on the displayed map information, and the processor may determine whether the location of the image forming apparatus is changed or not by comparing the set area with previously-stored area.

The processor may control the display to display the received map information when the power status of the image forming apparatus is changed from off state to on state.

The communicator may search the access points that can be connected and receives the access point information from the searched access points, and the processor may determine the location change of the image forming apparatus by using the received access point information with previously-stored access point information.

The access point information may include access point names of the access points, and the processor may determine the location of the image forming apparatus based on the access point names, and determine whether the location of the image forming apparatus is changed by using the determined location and previously-determined location.

The processor may compares signal strengths regarding a plurality of access points when the access point information is received respectively from a plurality of access points, and determine the location of the image forming apparatus by using access point information regarding the access point having the greatest signal strength.

When the access point information is received respectively from a plurality of access points, the processor may compare the signal strengths only regarding the access points in which the access point information including preset information is transmitted.

The communicator may receive access point information of an access point having the greatest signal strength among the access points that can be connected by a mobile apparatus from the mobile apparatus, and the processor may determine the location change of the image forming apparatus by using the received access point information and previously-stored access point information.

The image forming apparatus may additionally include a storage configured to store address information of a printing control terminal having the printing history in the image forming apparatus.

When the location of the image forming apparatus is determined to be changed, the processor may control the communicator to notify the location change respectively to the printing control terminals corresponding to the address information stored in the storage.

When the printing data is received after the location of the image forming apparatus is determined to be changed, the processor may control the communicator to notify the location change to the printing control terminal transmitting the printing data.

The processor may control the image former to print the received printing data when a printing continue command is received from the printing control terminal notifying the location change.

The processor may determine whether the printing control terminal transmitting the printing data has a printing history after the location of the image forming apparatus is changed, control the image former to print the previously-received printing data when the printing control terminal has the printing history, and control the communicator to notify the location change when the printing control terminal does not have the printing history.

The processor may control the communicator to notify the location change to a management server when the location of the image forming apparatus is determined to be changed.

When an apparatus information request is received from the printing control terminal after the location of the image forming apparatus is determined to be changed, the processor may control the communicator to transmit apparatus information together with location change information of the image forming apparatus to the printing control terminal transmitting the apparatus information request.

In an embodiment, a method for notifying a location of an image forming apparatus is provided, which may include determining location change of the image forming apparatus by using at least one of power status of the image forming apparatus and access point information of the access points that can be connected, and notifying the location change to a printing control terminal when the location of the image forming apparatus is determined to be changed.

The method may additionally include receiving an input of the location regarding the image forming apparatus when the power status of the image forming apparatus is changed from off state to on state, in which the determining location change may include determining the location change of the image forming apparatus by using the inputted location and previously-stored location.

The method may additionally include searching the access points that can be connected and receiving access point information from the searched access points, in which the determining location change may include determining the location change of the image forming apparatus by using the received access point information and previously-stored access point information.

The access point information may include access point names of the access points, and the determining location change may include determining the location of the image forming apparatus based on the access point names, and determining whether the location of the image forming apparatus is changed or not by comparing the determined location with previously-stored location.

BRIEF DESCRIPTION OF THE DRAWINGS

The above and/or other aspects of the present inventive concept will be more apparent by describing certain exemplary embodiments of the present inventive concept with reference to the accompanying drawings, in which.

DETAILED DESCRIPTION OF EXEMPLARY EMBODIMENTS

Figure 1:
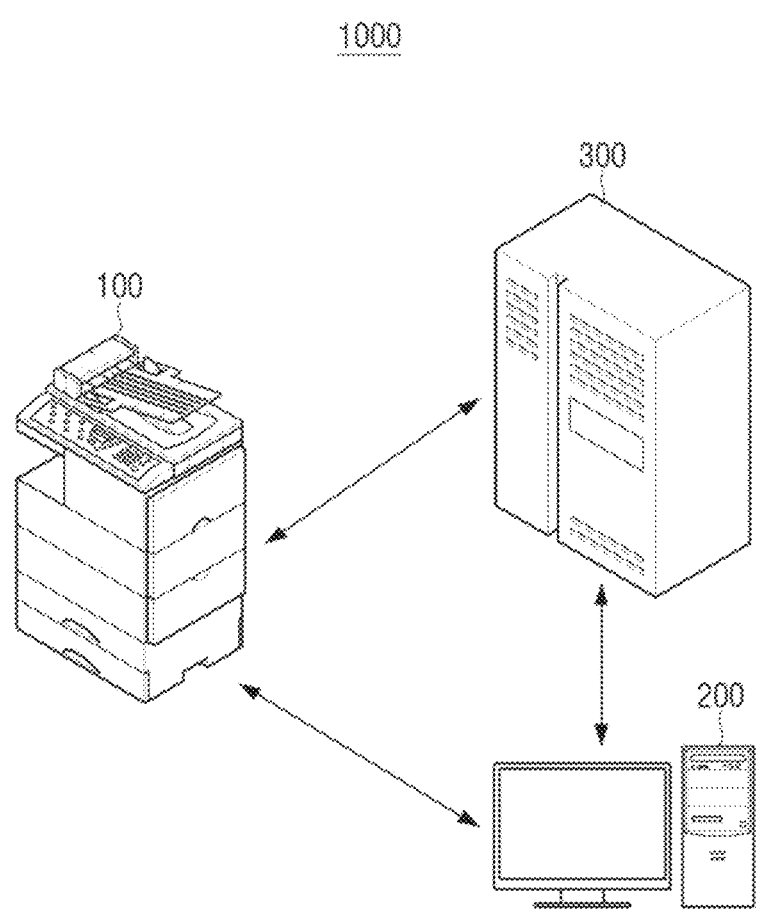
FIG. 1 is a block diagram illustrating an image forming system according to an embodiment.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

The term such as "first" "second", and so on may be used to explain a variety of elements, but the elements should not be limited thereto. The terms are used solely for the purpose of distinguishing one element from another element.

The terms used herein are only used to describe a certain embodiment, and are not intended to limit the scope of right. Unless otherwise specified, a singular expression includes a plural expression. The term such as "comprise" or "composed of" as used herein are intended to designate existence of characteristics, numbers, steps, operations, elements, parts, or a combination thereof, and not to be understood as precluding existence or possibility of adding one or more of another characteristics, numbers, steps, operations, elements, parts or combinations thereof.

A "module" or "unit" as used herein perform at least one function or operation and may be implemented as hardware or software, or a combination of hardware and software. Further, except the "module" or the "unit" that has to be implemented as a certain hardware, a plurality of "modules" or a plurality of "units" may be integrated into at least one module and implemented as one single processor (not illustrated).

Hereinbelow, the present disclosure will be described in detail with reference to the accompanying drawings.

FIG. 1 is a block diagram illustrating an image forming system according to an embodiment.

Referring to FIG. 1, the image forming system 1000 may be composed of an image forming apparatus 100, a printing control terminal 200, and a management server 300.

The image forming apparatus 100 may be connected to the printing control terminal 200 and the management server 300 through network. Further, the image forming apparatus 100 may receive the printing data from the printing control terminal 200 or the management server 300, and print the received printing data.

The image forming apparatus 100 may sense change of a location, and notify such location change to the printing control apparatus 200 and/or the management server 300. The location change of the image forming apparatus 100 may be determined according to various methods and a specific method for determining the location change will be described below by referring to FIGS. 5 to 7 and FIG. 11. The image forming apparatus 100 may perform at least one function among a scan function, a print function, a fax function, and a copy function. The image forming apparatus 100 may be a printer, a scanner, a copy machine, a facsimile, and a multi-function peripheral combining the functions mentioned above. Specific constitution and operation of the image forming apparatus 100 will be described below by referring to FIG. 3.

The printing control terminal 200 may generate printing data regarding a document. Further, the printing control terminal 200 may transmit the generated printing data to the image forming apparatus 100 to perform the printing job among the image forming apparatuses connected to the network.

A user of the printing control terminal 200 may set and use a frequently-used image forming apparatus 100 as a default printer in which case the selecting operation described above may be omitted.

When the printing control terminal 200 is notified of the location change from the image forming apparatus 100 which is set to be default printer, the printing control terminal 200 may display that the image forming apparatus 100 has been moved. The displaying operation may be performed at a time point when the notification is received or when a user performs the printing job.

For example, when the location change is notified from the image forming apparatus 100, the printing control terminal 200 may store the location change, and display that the default printer has been moved in response to a user driving a printer driver for the printing job. Thus, the user realizing the movement may change the default printer of the printing control apparatus 200 into another printer. Specific constitution and operation of the printing control apparatus 200 will be described below by referring to FIG. 16.

The management server 300 may be connected to the image forming apparatus 100 and the printing control terminal 200 through the network. The management server 300 may manage the printing history of the printing control terminal 200 and the location of the image forming apparatus 100.

Further, the management server 300 may notify the location change to the printing control terminal 200 within the image forming system 1000 when being notified of the location change from the image forming apparatus 100. The management server 300 may notify the location change only to the printing control terminal 200 having the printing history of using the location-moved image forming apparatus 100 by considering the previously-stored printing history. Specific constitution and operation of the management server 300 will be described below by referring to FIG. 17.

The image forming system 1000 according to the embodiment described above may sense the location change of the image forming apparatus, and notify the location change to the printing control terminals by using the corresponding image forming apparatus. Thus, printing with an unintended image forming apparatus can be prevented. Further, because the printing control terminal 200 may be notified of the changed location, the printed materials can be conveniently picked up, the stability for the loss of the printed materials or the secured printed materials can be obtained, and personal information in the printed materials can be protected.

Although it is explained above that the image forming system 1000 includes the management server by referring to FIG. 1, the management server may be omitted in actual implementation. Further, although the above illustrates that each unit is directly connected wiry, each unit can be connected wirelessly in actual implementation, and connected indirectly through a router or an access point.

Further, although FIG. 1 illustrates that one image forming apparatus is arranged in the image forming system 1000, a plurality of image forming apparatuses may be arranged in actual implementation. Further, a plurality of printing control terminals may be arranged.

Meanwhile, although it is explained above that the printing control terminal 200 directly generates the printing data and transmits it to the image forming apparatus 100 by referring to FIG. 1, the printing control terminal 200 may transmit the printing data to the management server 300 in actual implementation, and the management server 300 may deliver the printing data to the image forming apparatus 100. In this case, the generation of the printing data may be also performed at the management server 300 instead of the printing control terminal 200. Thus, the printing control terminal 200 may deliver the document to the management server 300. The management server 300 may convert the delivered document into the printing data and transmit it to the image forming apparatus 100.

Figure 2:
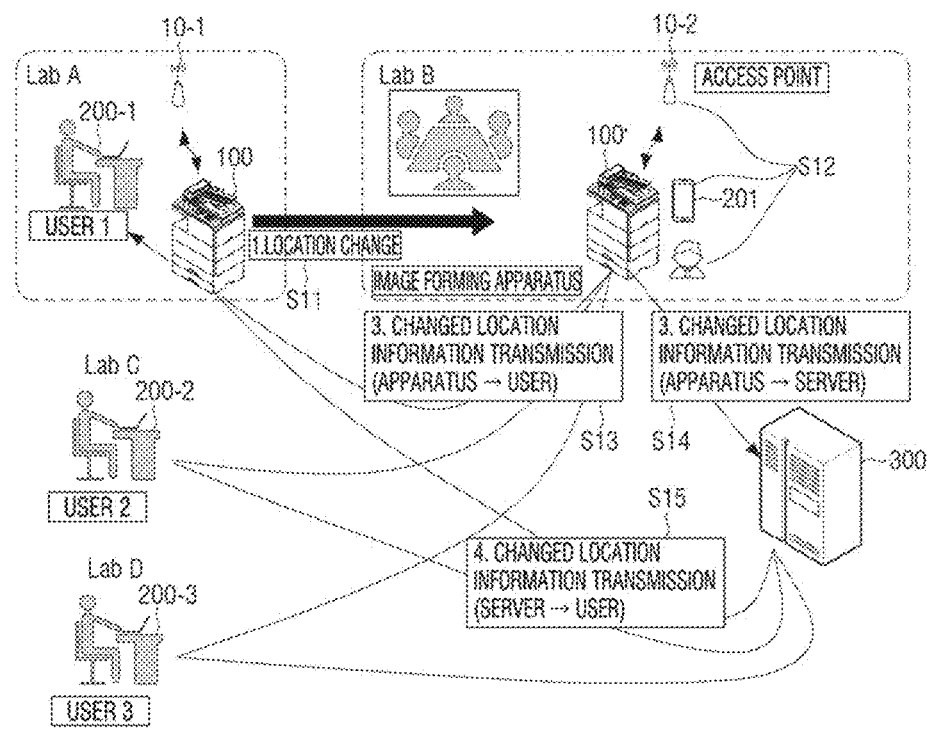
FIG. 2 is a diagram provided to explain a method for notifying a location when the location of an image forming apparatus is changed.

FIG. 2 is a diagram provided to explain a method for notifying the location when the location of the image forming apparatus is changed.

Referring to FIG. 2, in a first space (Lab A), the image forming apparatus 100, the first printing control terminal 200-1, and a first access point 10-1 may be arranged. It is assumed herein that the name of the first access point 10-1 is CompanyA_Lab_A.

The image forming apparatus 100 may confirm the first access point 10-1 by searching ambient access points, and receive the access point information from the first access point 10-1. Further, the image forming apparatus 100 may confirm the location to be CompanyA_Lab_A or confirm the location to be Lab_A by using name information among the received access point information. In this case, the image forming apparatus 100 may store the confirmed location.

Under the above circumstance, a manager may move the image forming apparatus 100 to a second space (Lab B), at S11.

In the second space (Lab B), the moved image forming apparatus 100' and a second access point 10-2 may be arranged. In this case, the name of the second access point 10-2 is assumed to be CompanyA_Lab_B.

The image forming apparatus 100' moved to the second space may confirm its location again, at S12.

Specifically, the image forming apparatus 100' moved to the second space will be temporarily cut off the power for the movement, and the power may be turned on after the movement. Thus, the image forming apparatus 100' may display UI to receive from a user (or a manager) a confirmation regarding whether the image forming apparatus has been moved, and receive an input of the location change and the changed location through UI when the power status is changed from off state to on state. The determining method will be specifically explained below by referring to FIG. 11.

Further, the image forming apparatus 100' may search ambient access points and determine the location change of the image forming apparatus 100 by using the access point information of the searched access point 10-2 when the power status of the image forming apparatus 100' is changed from off state to on state. Specifically, when the previously-stored access point information and the newly-obtained access point information are different from each other, the image forming apparatus 100' may determine that the location is changed. The determining method will be specifically explained below by referring to FIGS. 5 and 6.

Meanwhile, when the image forming apparatus 100 does not include a wireless module for searching the access point, the image forming apparatus 100 may confirm the location change of the image forming apparatus 100 by using the access point information searched at the printing control terminal 200. The determining method will be specifically explained below by referring to FIG. 7.

The image forming apparatus 100' determining that the location is changed may notify the location change to the printing control terminal 200 and the management server 300. Specifically, when the printing history is stored in the image forming apparatus 100', the image forming apparatus 100' may notify the location change to the printing control terminals 200-1, 200-2, 200-3 having the printing history, at S13. Meanwhile, when the printing history is stored in the management server 300, the image forming apparatus 100 may notify the location change to the management server 300, at S14. The management server 300 receiving the notification of the location change may notify the location change to the terminals 200-1, 200-2, 200-3 having the printing history regarding the location-moved image forming apparatus 100, at S15.

The image forming system 1000 according to an embodiment may sense the location change of the image forming apparatus, and notify the location change to the printing control terminal which uses the corresponding image forming apparatus. Thus, the printing with the unintended image forming apparatus can be prevented.

Meanwhile, although it is explained above that sensing of the location change is performed with one method, a plurality of methods may be combined in actual implementation. For example, when the location change is sensed according to the method of using the access point, the location change may be additionally determined by confirming the location change from a user through UI or by receiving input of the changed location.

Figure 3:
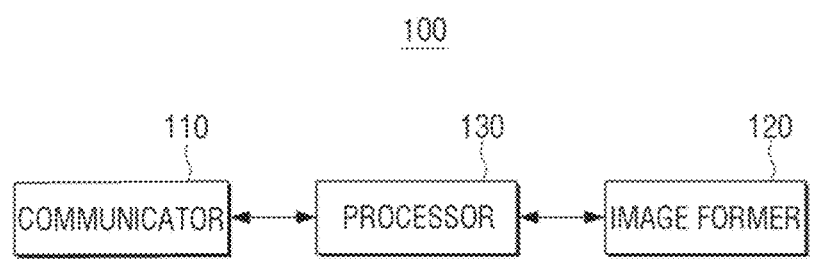
FIG. 3 is a block diagram illustrating brief constitution of the image forming apparatus according to an embodiment.

FIG. 3 is a block diagram illustrating brief constitution of the image forming apparatus according to an embodiment.

Referring to FIG. 3, the image forming apparatus 100 may be composed of a communicator 110, an image former 120, and a processor 130.

The communicator 110 may be formed to connect the image forming apparatus 100 to an external apparatus (e.g., printing control terminal 200, management server 300 and other image forming apparatuses). The communicator may be connected to an external apparatus through universal serial bus (USB) port as well as local area network (LAN) and internet network.

Further, the communicator 110 may search access points that can be connected. Specifically, the communicator 110 may search access points that can be connected in the surrounding area of the image forming apparatus 100 (e.g., service set identifier (SSID), basic set identifier (BSID) and received signal strength indication (RSSI) with each access point.

Further, the communicator 110 may receive the access point information from the searched access point. In this case, the access point information may be description information of the access point, and include names of the access points.

Further, the communicator 110 may receive the location information from the printing control terminal 200 by using near field communication (NFC). In this case, the location information may be the whole access point information received from the printing control terminal 200, or access point information regarding the access point having the greatest RSSI in the printing control terminal 200.

The communicator 110 may receive the printing data. Specifically, the communicator 110 may receive the printing data from the printing control terminal 200 or the management server 300. In this case, the printing data may be data in the printer language such as postscript (PS) or printer control language (PCL). When the image forming apparatus 100 supports direct printing, the printing data may be files such as PDF, XPS, BMP, and JPG.

Further, the communicator 110 may notify the status information of the image forming apparatus 100 to the management server 300. In this case, the status information may include information regarding whether the image forming apparatus performs the printing (including occurrence of errors), information regarding the location, information regarding functions that can be performed, and information regarding the printer driver corresponding to the image forming apparatus.

Further, the communicator 110 may transmit the historic printing information to the management server 300.

Further, the communicator 110 may notify completion of the printing to the printing control terminal 200 or the management server 300 when the printing is completed.

Further, the communicator 110 may notify that the change of location to the printing control terminal 200 and/or the management server 300 when the location of the image forming apparatus 100 is changed.

Further, the communicator 110 may transmit to the printing control terminal 200 a message to confirm whether or not to perform the printing. Specifically, the communicator 110 may receive the printing data from the specific printing control terminal 200. When it is the first printing data received after the location of the image forming apparatus 100 is moved, the communicator 110 may transmit a message to the printing control terminal 200 transmitting the printing data to notify that the image forming apparatus 100 is currently moved and to ask if the printing data is sent after realizing such location change. In response, the communicator 110 may receive a printing continue command or a printing cancel command from the printing control terminal 200.

The image former 120 may print the printing data. Specifically, the image former 120 may perform the printing job onto the printing paper by performing parsing and rendering regarding the printing data. In this case, the image former 120 may print the received printing data with at least one of ink jet method, dot jet method, and laser printer method onto the printing paper. In this case, the printing data may be data received through the communicator 110 or scan data generated at a scanner 170 which will be described below.

The processor 130 may control each unit within the image forming apparatus 100. Specifically, the processor 130 may control the image former 120 to perform the printing job regarding the received printing data when the printing data is received from the printing control terminal 200 or the management server 300. The processor 130 may be named as a controller in view of its role of controlling each unit within the image forming apparatus 100, and may be implemented to be CPU or microprocessor.

Further, the processor 130 may determine whether or not there is need to sense the location of the image forming apparatus 100. Specifically, the processor 130 may determine that it is necessary to sense the location of the image forming apparatus 100 when the power status of the image forming apparatus 100 is changed from off state to on state. Conventionally, once the power is connected, the image forming apparatus 100 arranged at public offices and business offices may be seldom cut off the power until the movement. Thus, the processor 130 may determine whether or not the location of the image forming apparatus has been changed when the power status of the image forming apparatus 100 is changed from off state to on state.

Further, the processor 130 may determine the location change of the image forming apparatus by using at least one of the power of the image forming apparatus and the access point information regarding the access points that can be connected. Specifically, the processor 130 may determine the current location of the image forming apparatus by using various methods, and determine the location change by comparing the determined location with the previously-stored location.

For the first determining method, the processor 130 may directly receive the location of the image forming apparatus 100 from a user. Specifically, the processor 130 may determine the current location by receiving the location of the image forming apparatus 100 from a user when the power status of the image forming apparatus 100 is changed from off state to on state. Further, the processor 130 may determine the location change of the image forming apparatus 100 by comparing the previously-stored location with the current location.

For the second determining method, the processor 130 may determine the current location by receiving the current location of the previously-stored map information from a user. Further, the processor 130 may determine that the location is changed when the location set from the displayed map is different from the previously-stored location. Such map information may be previously-received and stored from the management server 300, or may be received in response to a request made to the management server 300 at the time point when the power is turned on again after being cut off.

For the third determining method, the processor 130 may search the access points that can be connected, receive the access point information from the searched access points, and determine the location of the image forming apparatus 100 by using the received access point information. For example, the access point information may include names of the access points, and conventionally, the names of the access points may include the location information where the access points are positioned. Thus, the processor 130 may extract the names of the access points from the access point information regarding the access points that can be connected, and determine the location by using the extracted names. Meanwhile, when there are a plurality of access points that can be connected, the processor 130 may use the access point information regarding the access point having the greatest RSSI. The processor 130 may first perform the operation described above by only using the access points having preset information (specifically, location indications, e.g., floor information, company name, local area name) among the access points that can be connected.

Further, the processor 130 may determine that the location is changed when the access point that can be connected is changed, i.e., when the access point information regarding the previously-stored access points is different from the access point information regarding the currently received access points.

For the fourth determining method, the processor 130 may determine the location by receiving the location information from the printing control terminal 200 in which the access point can be searched when the image forming apparatus 100 is not available to search the access point, e.g., when the wireless module is not provided or out of function. In this case, the location information may be a position of the image forming apparatus 100 or access point information of the access points searched at the printing control terminal 200.

Further, the processor 130 may determine that the location is changed when the location information received from the printing control terminal 200 is different from the previously-stored location information.

When the location change is determined, the processor 130 may control the communicator 110 to notify the location change to the printing control apparatus 200 and/or the management server 300. In this case, the processor 130 may notify the location change only, or notify the changed location information together. Further, the processor 130 may notify the change to all the apparatuses connected to the network, or notify the change only to the printing control terminal 200 having the printing history regarding the image forming apparatus 100.

After notifying, the processor 130 may determine whether or not to notify the location change to the corresponding printing control terminal 200 when the printing data is received from the printing control terminal 200. Specifically, when the printing control terminal 200 transmitting the printing data first transmits the printing data after the location change of the image forming apparatus 100, the corresponding printing control terminal 200 may be the apparatus which is not notified of the change.

Thus, the processor 130 may determine that the change is confirmed by using the previously-stored historic printing information when the printing control terminal 200 transmitting the printing data does not have the printing history after the location change. Further, the processor 130 may temporarily stop the printing job regarding the received printing data, and control the communicator 110 to transmit a message confirming the location information and a message to confirm whether or not to perform the printing to the printing control terminal 200 transmitting the corresponding printing data.

When a printing continue command is received from the printing control terminal 200 after a message is transmitted, the processor 130 may control the image former 120 to print the previously-received printing data.

When a printing cancel command is received from the printing control terminal 200, the processor 130 may cancel the printing job regarding the previously-received printing data, and delete the printing data when it is stored in the storage 160. Meanwhile, when a response is not received from the printing control terminal 200 for a preset time after a message to confirm whether or not to perform the printing is transmitted, the processor 130 may process as if it receives a cancel command, or store and manage the received printing data in the storage 160.

On the contrary, when the printing data is received from the printing control terminal 200 having the printing history, the processor 130 may control the image former 120 to print the received printing data without separately giving notification.

Further, the processor 130 may control the image former 120 to immediately perform the printing regarding the received printing data. The processor 130 may control the communicator 110 to notify the completion of the printing job and the location information of the image forming apparatus 100 to the corresponding printing control terminal 200 when the printing job is completed. In actual implementation, the operation of notifying the location may be performed only at the printing control terminal 200 having no printing history after the location of the image forming apparatus 100 is moved.

The image forming apparatus 100 according to an embodiment may sense the location change of the image forming apparatus and notify the location change to the printing control terminal using the corresponding image forming apparatus. Thus, the printing performed by the unintended image forming apparatus can be prevented. Further, because the image forming apparatus 100 may provide the moved location information to the printing control terminal 200, a user can easily recognize the location of the moved image forming apparatus. Thus, the printed materials can be easily picked up, the stability regarding the loss of the printed materials and the secured printed materials can be obtained, and the personal information of the printed materials can be protected.

Meanwhile, although the above illustrates and explains the simple constitution of the image forming apparatus, various new units may be additionally included in actual implementation. This will be explained below by referring to FIG. 4.

Figure 4:
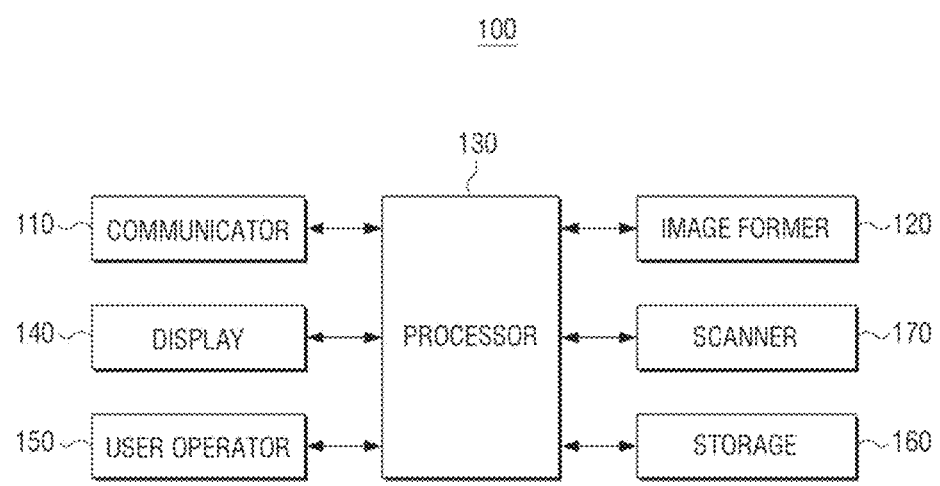
FIG. 4 is a block diagram illustrating a specific constitution of an image forming apparatus according to an embodiment.

FIG. 4 is a block diagram illustrating a specific constitution of the image forming apparatus according to an embodiment.

Referring to FIG. 4, the image forming apparatus 100 may be composed of a communicator 110, an image former 120, a processor 130, a display 140, a user operator 150, a storage 160 and a scanner 170.

The communicator 110, the image former 120 and the processor 130 are the same as the constitution illustrated in FIG. 3, which will not be redundantly explained below for the purpose of brevity.

The display 140 may display various information provided from the image forming apparatus 100. The display 140 may be a display such as monitor. In actual implementation, it may be also implemented to be a touch screen which can perform functions of the user operator 150 (to be described) on one unit.

The display 140 may display menu UI to receive selecting of a function supported by the image forming apparatus 100.

Further, the display 140 may display UI to receive an input of the location information. Specifically, the display 140 may display UI to receive an input of the current location regarding the image forming apparatus 100 when the power status of the image forming apparatus is changed from off state to on state.

Further, the display 140 may display UI to confirm the location change. Specifically, the access point that can be connected by the image forming apparatus 100 may be changed even when the location of the image forming apparatus is not changed. For example, the location of the image forming apparatus 100 may be determined to be moved even when a name of the access point is changed or when a new access point is arranged. Thus, when the image forming apparatus 100 is determined to be moved because of the change in the access point, the display 140 may display UI to confirm the location change.

Further, the display 140 may display UI for setting of a period when the location change is notified. This will be described below by referring to FIG. 13.

Further, the display 140 may display that the user verification is necessary after the printing data is received. The display 140 may display user interface window for the verification corresponding to the received user verification information. For example, the display 140 may display a screen to receive a password when the verification information is password, or display guide information for NFC tag when the verification information is NFC information.

Further, the user operator 150 may include a plurality of function keys with which the user may set or select various functions supported by the image forming apparatus 100. The user operator 150 may be implemented to be device such as button, touch pad, mouse and keyboard, or may be implemented to be touch screen that can also perform the function of the display 140.

The user operator 150 may receive a function to be performed among the functions supported by the image forming apparatus. Further, the user operator 150 may receive the setting of the options regarding the selected function.

Further, the user operator 150 may receive an input of the location information from a user. The user operator 150 may receive the selecting between confirmation and cancelation of the location change. The user operator 150 may be set regarding a period when the location change is notified.

The user operator 150 may receive an input of the verification information. In this case, the verification information may be information that can identify a user, and may be user name, ID, employee ID number, password, and so on.

The storage 160 may store the printing data received through the communicator 110. Further, the storage 160 may store the scan images generated at the scanner 170, which will be described below.

The storage 160 may store the location information of the image forming apparatus 100. Further, the storage 160 may store the map information of the space where the image forming apparatus 100 is located.

The storage 160 may store the historic printing information. In this case, the historic information may include the information (e.g., address information) regarding the printing control terminal 200 transmitting the printing data.

Further, the storage 160 may store programs and data for creating various UIs constituting the user interface window.

Meanwhile, the storage 160 may be implemented to be a built-in storing medium of the image forming apparatus 100, or an external storing medium such as, for example, removable disk including USB memory, networked web server, and so on.

The scanner 170 may generate a scan image by scanning a document. Specifically, the scanner 170 may include a light emitter (not illustrated) which emits the light toward a document, a lens (not illustrated) which focuses the light reflected from the document onto an internal image sensor, an image sensor, and so on. Further, the scanner 170 may read image information of the document from the light focused on the image sensor.

The scanner 170 may be an apparatus configured to scan a document lain on the flatbed, an apparatus configured to scan one side or both sides of a document fed to ADF, or a combination of the above two apparatuses. Meanwhile, the scanner 170 may generate one file with a plurality of scan images which are consecutively scanned in ADF.

As described above, the image forming apparatus 100 according to an embodiment may sense the location change of the image forming apparatus, and thus, notify the location change to the printing control terminal using the corresponding image forming apparatus. Thus, the printing performed by the unintended image forming apparatus can be prevented.

Meanwhile, although the above illustrates and explains that the image forming apparatus 100 includes both the scanner and the image former by referring to FIG. 4, the image forming apparatus 100 may include the image former only or the scanner only in actual implementation. When the image forming apparatus 100 includes the scanner only, the image forming apparatus may be named as an image reading apparatus. Further, the image forming apparatus 100 may further include another constitution (e.g., faxing unit) as well as the units described above.

Figure 5:
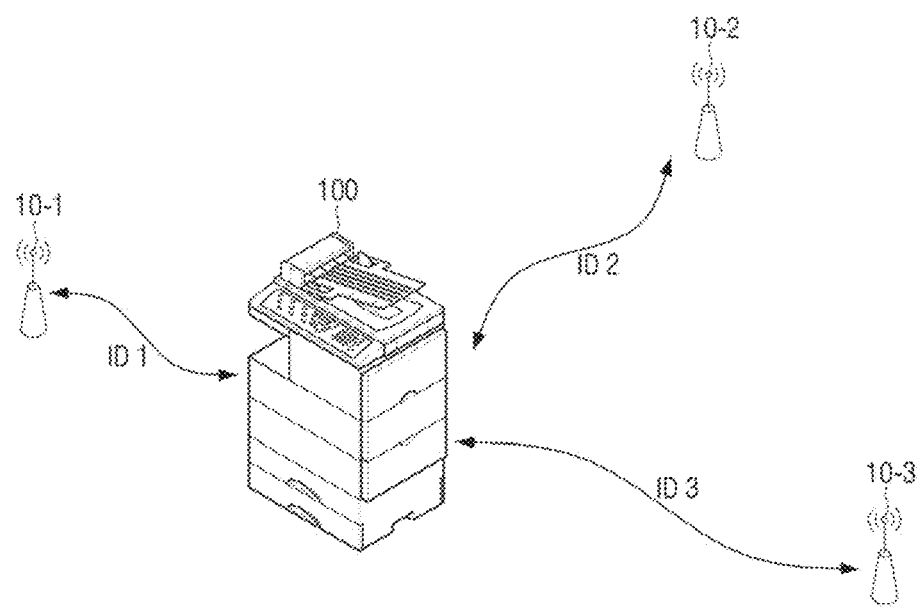
FIG. 5 is a diagram provided to explain a method for determining a location of an image forming apparatus according to an embodiment.

FIG. 5 is a diagram provided to explain a method for determining the location of the image forming apparatus according to an embodiment.

Referring to FIG. 5, three access points 10-1, 10-2, 10-3 may be arranged in the ambient area of the image forming apparatus 100. In this case, it is assumed that a name of the first access point 10-1 is CompanyA_5Floor_Azone, a name of the second access point 10-2 is CompanyA_5Floor_Bzone, and a name of the third access point 10-3 is CompanyA_5Floor_Czone.

In this case, the image forming apparatus 100 may receive the access point information respectively from the access points 10-1, 10-2, 10-3 that can be connected. In this case, the image forming apparatus 100 may determine the location by using the received access point information. Specifically, the image forming apparatus 100 may determine the location of the image forming apparatus 100 by using the common name among the three access point names. For example, the image forming apparatus 100 may determine that the current location is 5 Floor of Company A.

Alternatively, the image forming apparatus 100 may receive the access point information only from the access point having the greatest signal strength among the access points 10-1, 10-2, 10-3 that can be connected. Further, the location of the image forming apparatus 100 may be determined by using the received access point information. For example, when the signal strength of the first access point 10-1 is greatest in the embodiment of FIG. 5, the image forming apparatus 100 may determine the location to be 5 Floor and A zone of Company A.

Further, the image forming apparatus 100 may determine whether or not the location of the image forming apparatus 100 is moved, by comparing the location determined according to the method above described with the previously-stored location.

Figure 6:
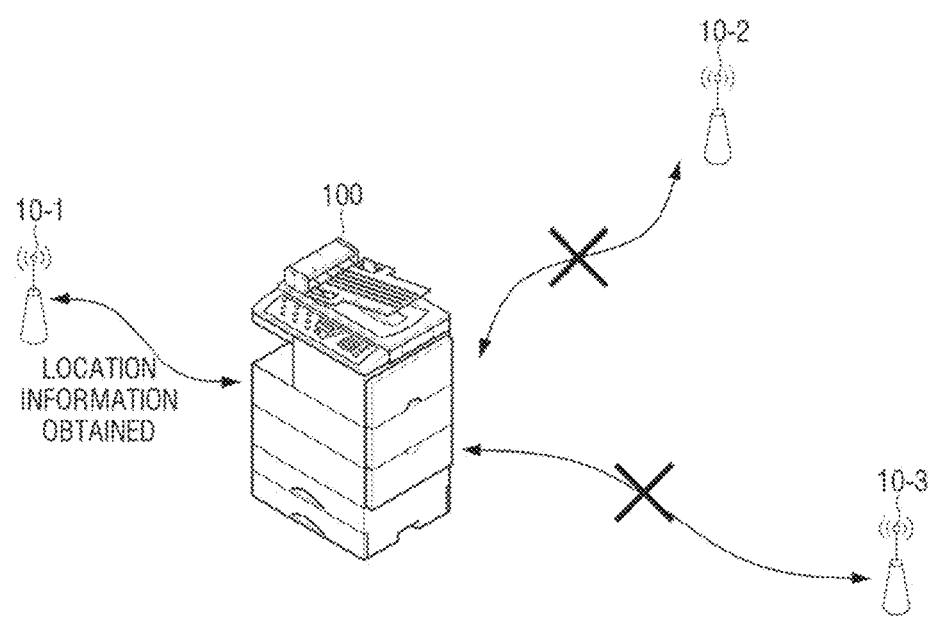
FIG. 6 is a diagram provided to explain a method for determining a location of an image forming apparatus according to another embodiment.

FIG. 6 is a diagram provided to explain the method for determining the location of the image forming apparatus according to another embodiment.

Referring to FIG. 6, the three access points 10-1, 10-2, 10-3 may be arranged in the ambient area of the image forming apparatus 100. In this case, it is assumed that a name of the first access point 10-1 is CompanyA_5Floor_Azone, a name of the second access point 10-2 is abcdef, and a name of the third access point 10-3 is CompanyB_5Floor_Czone.

In this case, the image forming apparatus 100 may receive the access point information respectively from the access points 10-1, 10-2, 10-3 that can be connected. Further, the image forming apparatus 100 may select the access point having the preset information among the received access point information. For example, when the preset information is Company A, the image forming apparatus 100 may determine the location of the image forming apparatus 100 by using only the access point information received from the first access point 10-1 having the name of Company A. For example, according to the embodiment of FIG. 6, the image forming apparatus 100 may determine that the current location is 5 Floor and A zone of Company A.

Further, the image forming apparatus 100 may determine whether or not the location of the image forming apparatus 100 is moved, by comparing the location determined according to the above described method with the previously-stored location.

Figure 7:
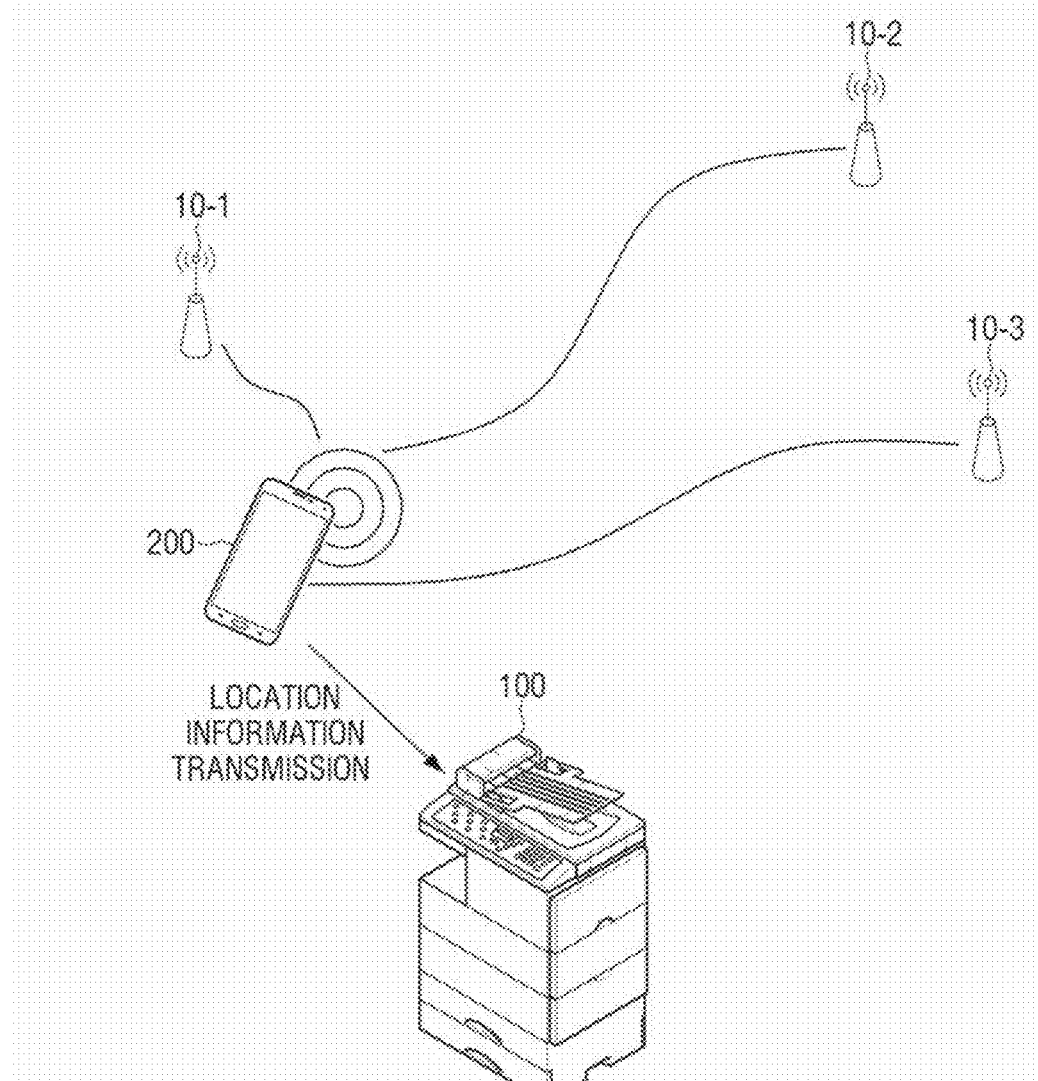
FIG. 7 is a diagram provided to explain a method for determining a location of an image forming apparatus according to another embodiment.

FIG. 7 is a diagram provided to explain the method for determining the location of the image forming apparatus according to another embodiment.

Referring to FIG. 7, the three access points 10-1, 10-2, 10-3 may be arranged in the ambient area of the image forming apparatus 100. In this case, it is assumed that a name of the first access point 10-1 is CompanyA_5Floor_Azone, a name of the second access point 10-2 is CompanyA_5Floor_Bzone, and a name of the third access point 10-3 is CompanyB_5Floor_Czone. Further, it is assumed that the image forming apparatus 100 cannot perform the searching of the access points.

Because searching the access points cannot be performed by the image forming apparatus 100, a user or a manager may search the access points that can be connected after bringing the printing control terminal 200 to the ambient area of the image forming apparatus 100.

Further, the printing control terminal 200 may receive the access point information from the searched access points 10-1, 10-2, 10-3. The printing control terminal 200 may determine one access point used in determining the location among the received access point information. For example, the printing control terminal 200 may transmit to the image forming apparatus 100 the location information (e.g., 5 Floor and A zone of Company A) only from the access point information received from the first access point 10-1 having the greater signal strength among the first access point 10-1 and the second access point 10-2 which have the name of Company A. Meanwhile, both CompanyA_5Floor_Azone and CompanyA_5Floor_Bzone may be transmitted as location information without distinguishing the signal strength in actual implementation.

Meanwhile, although the above illustrates and explains that the printing control terminal 200 may transmit only one location information to the image forming apparatus 100 by referring to FIG. 7, the printing control terminal 200 may perform the operation of delivering all the access point information regarding the searched access points 10-1, 10-2, 10-3 to the image forming apparatus 100 in actual implementation. Thus, the image forming apparatus 100 may redetermine the location by using the delivered access point information.

The image forming apparatus 100 may determine whether or not the location of the image forming apparatus 100 is moved, by comparing the location received according to the above described method with previously-stored location.

Figure 8:
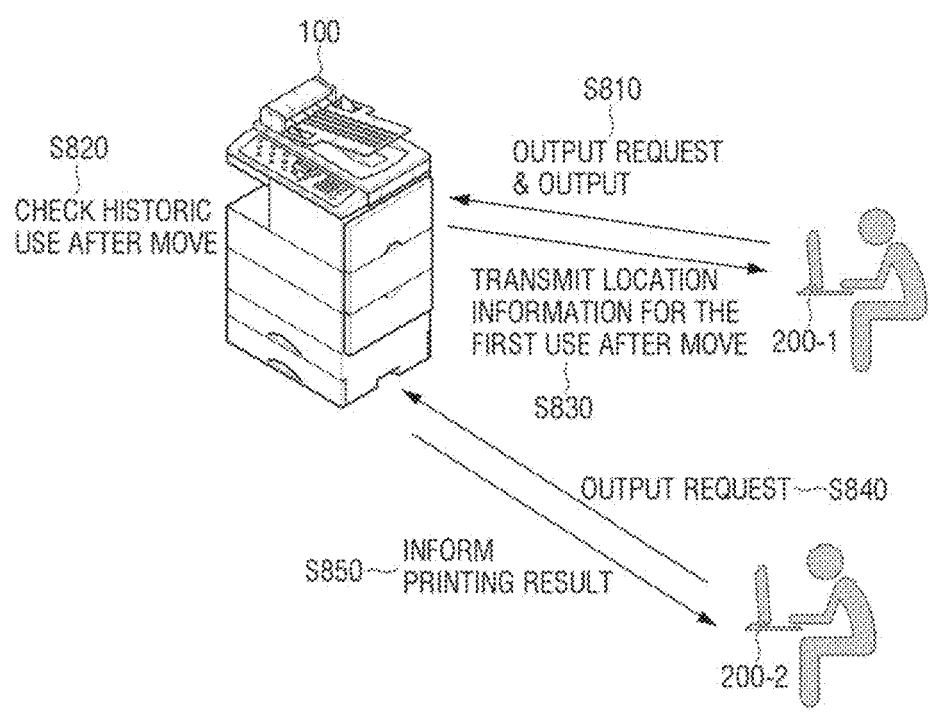
FIG. 8 is a diagram provided to explain a method for notifying a changed location according to an embodiment.

FIG. 8 is a diagram provided to explain a method for notifying the changed location according to an embodiment.

Referring to FIG. 8, the image forming apparatus 100 in which the location is moved may be connected to the first printing control terminal 200-1 and the second printing control terminal 200-2. In this case, it is assumed that the first printing control terminal 200-1 is a printing control terminal with which the printing job has not been performed after the location of the image forming apparatus 100 was moved, and the second printing control terminal 200-2 is a printing control terminal having the history of performing the printing job after the location of the image forming apparatus 100 was moved.

The first printing control terminal 200-1 may request the printing to the image forming apparatus 100 by transmitting the printing data, at S810. The image forming apparatus 100 receiving the printing data may determine whether or not there is history of printing after the location of the first printing control terminal 200-1 was moved, by using the previously-stored historic printing information, at S820. The first printing control terminal 200-1 may first request the printing after the location of the image forming apparatus 100 was moved. Thus, the image forming apparatus 100 may notify the changed location of the image forming apparatus 100 to the first printing control terminal 200-1, and confirm whether or not to perform the printing, at S830.

When a printing continue command is received from the first printing control terminal 200-1, the image forming apparatus 100 may continue the printing regarding the previously-received printing data. When a printing cancel command is received from the first printing control terminal 200-1, the image forming apparatus 100 may cancel the job regarding the previously-received printing data.

Meanwhile, when the first printing control terminal 200-1 has no printing history before as well as after the location of the image forming apparatus 100 was moved, the corresponding printing control terminal 200-1 may be the printing control terminal of a user who recognizes that the image forming apparatus 100 was moved. In this case, the image forming apparatus 100 may process the printing request of the first printing control terminal 200-1 in the same manner as it processes a printing request of the second printing control terminal 200-2 which will be described below.

Meanwhile, when the printing is requested from the second printing control terminal 200-2 at S840, the image forming apparatus 100 may confirm whether or not the second printing control terminal 200-2 has the printing history after the location was moved, at S820. Because the second printing control terminal 200-2 has the printing history, the image forming apparatus 100 may immediately perform the printing job regarding the received printing data. Further, when the printing job is completed, the image forming apparatus 100 may notify the completion of the printing to the second printing control terminal 200-2.

Meanwhile, although the above illustrates and explains that the location change of the image forming apparatus is notified according to the printing history prior to the operation of the printing by referring to FIG. 8, the notifying operation described above may be performed after the printing. Thus, the image forming apparatus 100 may perform the printing when the printing data is received, and transmit the location information of the image forming apparatus with notifying completion of the printing to the printing control terminal 200 having no printing history prior to the location change according to the printing history prior to the location change.

Figure 9:
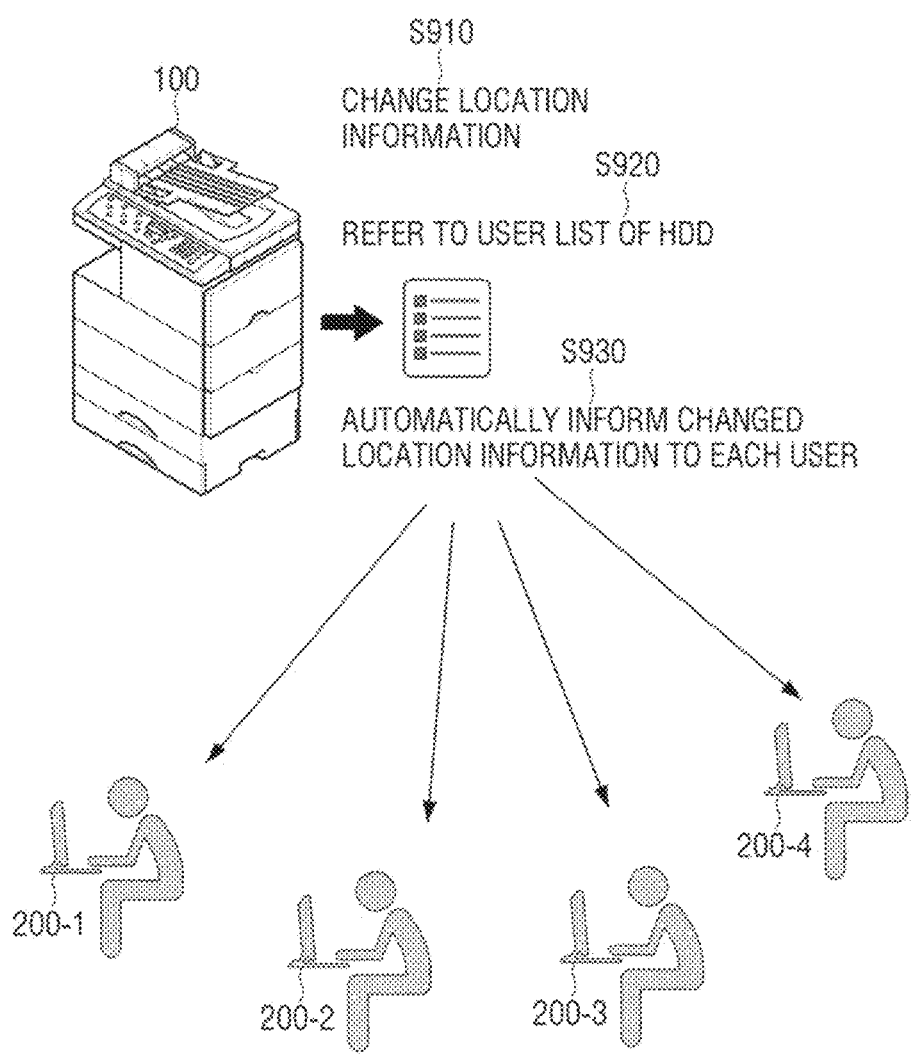
FIG. 9 is a diagram provided to explain a method for notifying a changed location according to another embodiment.

FIG. 9 is a diagram provided to explain a method for notifying a location change according to another embodiment.

Referring to FIG. 9, the image forming apparatus 100 may be connected to a plurality of printing control terminals 200-1, 200-2, 200-3, 200-4.

When the location change of the image forming apparatus 100 is determined, the image forming apparatus 100 may generate a list of the printing control terminals 200 having the printing history in the image forming apparatus 100 by using the historic printing information previously-stored in the image forming apparatus 100, at S920. In this case, the image forming apparatus 100 may generate a list only regarding the printing control terminals having the printing histories immediately before the movement among a plurality of histories.

Further, the image forming apparatus 100 may uniformly notify the location change to the printing control terminals by referring to the generated list, at S930. In this case, the image forming apparatus 100 may notify only the location change of the image forming apparatus 100 or notify the changed location information together.

The printing control terminals 200-1, 200-2, 200-3, 200-4 receiving the notification may store the received information, and determine whether or not the image forming apparatus notifying the location change is set to be default printer when the user drives printer driver for printing operation. When the location change is notified from the default printer, the printing control terminal 200 may display that the default printer needs to be changed because the location of the default printer is changed.

Meanwhile, if the printer is not default printer, the printing control terminal 200 may distinguishably display the location-changed image forming apparatus when a list of the image forming apparatuses that can be connected is displayed.

Figure 10:
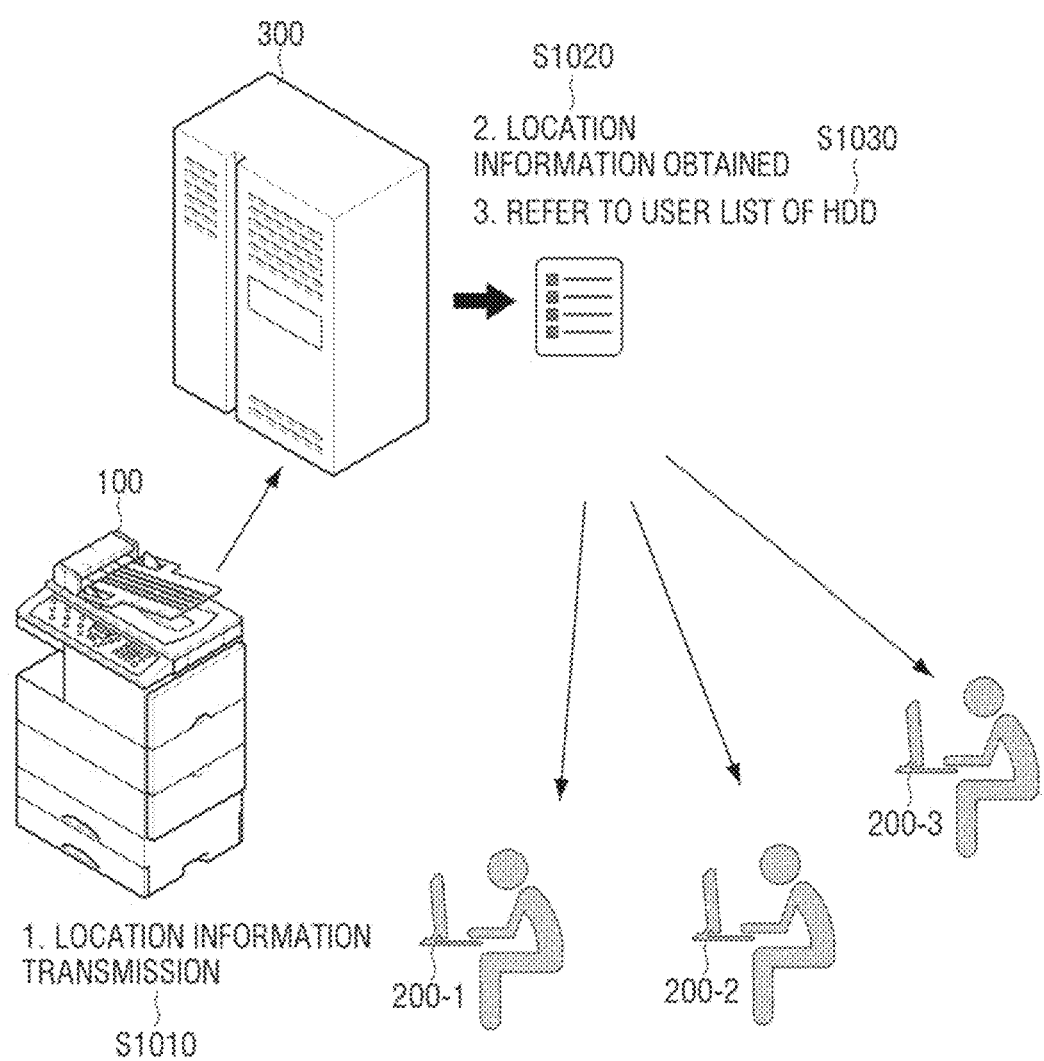
FIG. 10 is a diagram provided to explain a method for notifying a changed location according to another embodiment.

FIG. 10 is a diagram provided to explain the method for notifying the location change according to another embodiment.

Referring to FIG. 10, the image forming apparatus 100 may be connected to the management server 300 and a plurality of printing control terminals 200-1, 200-2, 200-3.

When the location change is determined, the image forming apparatus 100 may notify the change to the management server 300, at S1010.

The management server 300 receiving the notification of the change may generate a list of the printing control terminals having the printing history in the corresponding image forming apparatus 100, at S1020. In this case, the management server 300 may generate a list of only the printing control terminals having the printing history at a location immediately before the movement among a plurality of histories.

Further, the management server 300 may uniformly notify the location change to the printing control terminals by considering the generated list, at S1030. In this case, the management server 300 may notify only the location change of the image forming apparatus 100, or may transmit the changed location information together.

FIGS. 11 to 14 are diagrams illustrating various examples of the user interface window that can be displayed on the image forming apparatus of FIG. 1.

Figure 11:
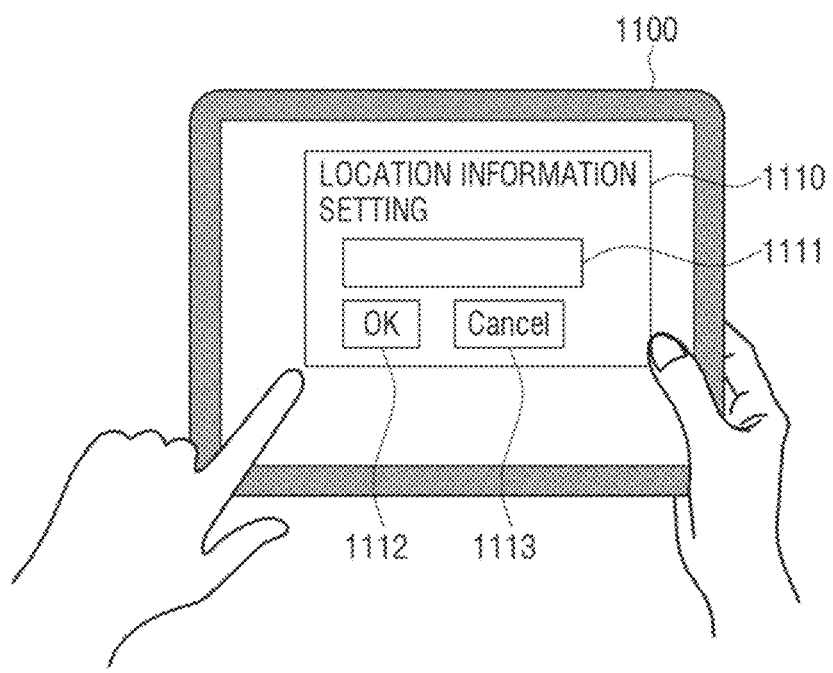
FIGS. 11 to 14 are diagrams illustrating various examples of a user interface window that can be displayed on the image forming apparatus of FIG. 1.

Specifically, FIG. 11 illustrates an example of the user interface window to receive an input of the location information regarding the image forming apparatus.

Referring to FIG. 11, the user interface window 1100 may include a notifying area 1110 where the need for the location information inputting is notified. Further, the notifying area 1110 may include an area 1111 where the location information is inputted, a confirm area 1112, and a cancel area 1113. The notifying area 1110 may be displayed when the power status of the image forming apparatus 100 is changed from off state to on state.

When the location of the image forming apparatus 100 is moved, a user or a manager may input the changed location through the area 1111 where the location information is inputted, and select the confirm area 1112. In this case, the image forming apparatus 100 may display the user interface window of FIG. 14 for setting of a period when the location is notified.

When the location is not moved, a user or a manager may select the cancel area 1113.

Meanwhile, although the above illustrates and explains that a user may directly input the location of the image forming apparatus 100 by referring to FIG. 11, a plurality of locations may be displayed and one may be selected among a plurality of displayed locations in actual implementation. A plurality of locations may be provided to the image forming apparatus 100 based on the location information of the image forming apparatuses 100 stored in the management server 300.

Figure 12:
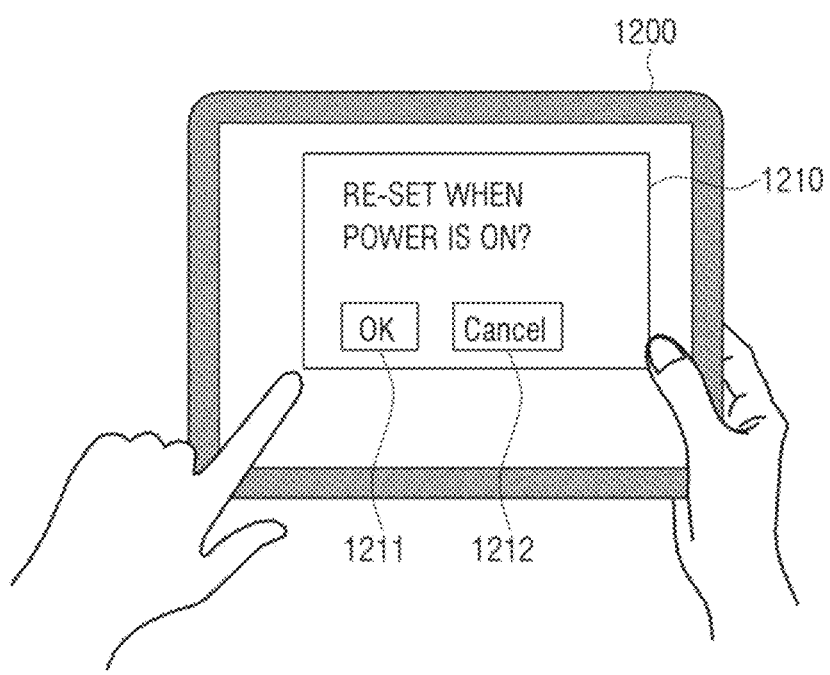

FIG. 12 illustrates the user interface window confirming whether or not to display the user interface window of FIG. 11.

Referring to FIG. 12, the user interface window 1200 may include a setting screen 1210 to receive settings for whether or not to display the location change confirm UI when the power is on. The corresponding setting screen 1210 may include a confirm area 1211 and a cancel area 1212.

When a user selects the confirm area 1211 and when the power status of the image forming apparatus 100 is changed from off state to on state, the user interface window 1100 of FIG. 11 may be automatically displayed.

When a user selects the cancel area 1212, the user interface window 1100 of FIG. 11 may not be displayed even when the power status of the image forming apparatus 100 is changed from off state to on state. When the location of the image forming apparatus 100 is changed after the cancel area 1212 is set, a user may display the user interface window of FIG. 11 on the setting menu and input the changed location information.

Figure 13:
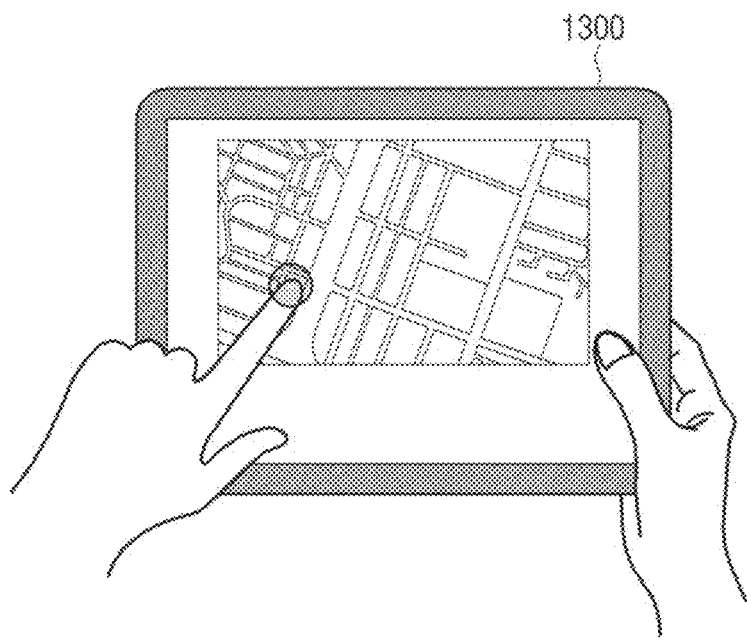

FIG. 13 is a diagram illustrating an example of the user interface window to receive the setting of the location on the displayed map information.

Referring to FIG. 13, the user interface window 1300 may display a map of the space in which the image forming apparatus 100 is located.

When a user selects one point on the map, the image forming apparatus 100 may set the selected point as the current location of the image forming apparatus. In this case, the location may be coordinate values, and when the location name is matched with the location on the map, the matched location name may be set to be the location.

Figure 14:
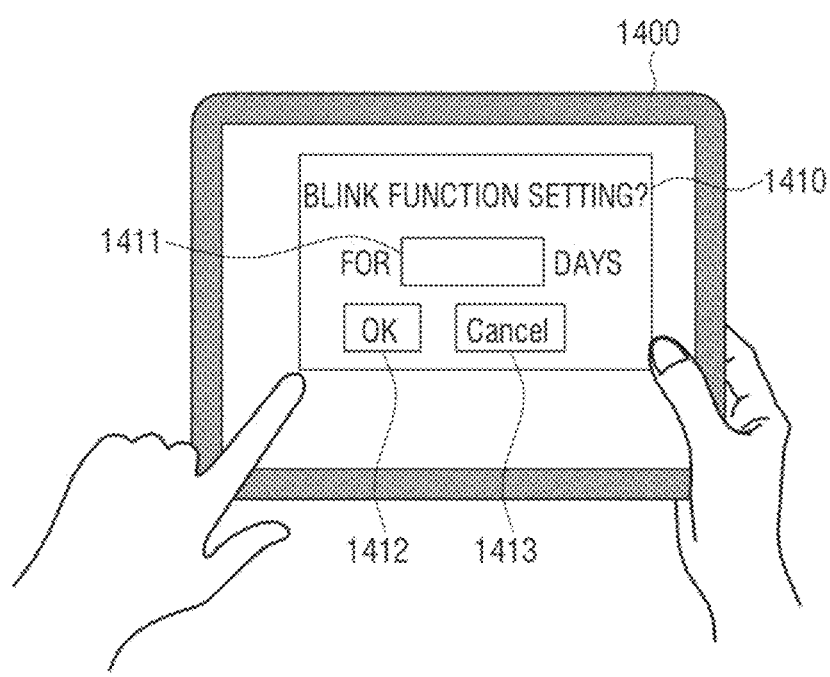

FIG. 14 illustrates an example of the user interface window to receive the setting a period during which the notifying of the location change is to be performed.

Referring to FIG. 14, the user interface window 1400 may include a setting area 1410 to receive the setting about the period for notifying of the location change. The corresponding setting area 1410 may include a period area 1411 for receiving a period, a confirm area 1412, and a cancel area 1413.

When a user inputs a date through the period area 1411 and sets the area 1412, the image forming apparatus 100 may perform the above-described operation during the period corresponding to the inputted date. Further, the location change may be notified in response to a printing request of the printing control terminal having no printing history after the corresponding period.

When a user selects the cancel area 1413, the image forming apparatus 100 may notify the location change only once to the image forming apparatus 100 having the printing history, and may not notify the location change thereafter.

Figure 15:
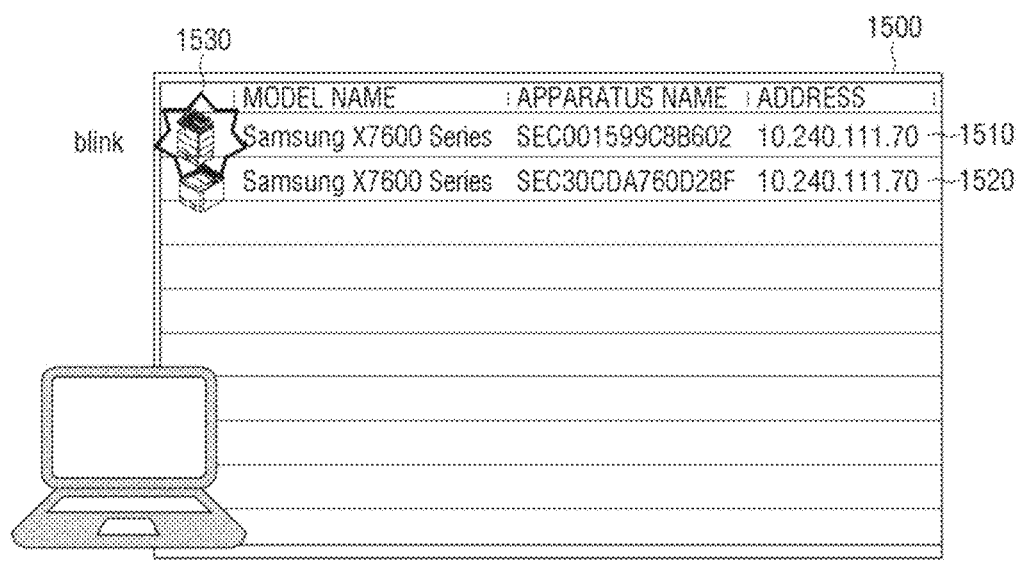
FIG. 15 is a diagram illustrating an example of a user interface window that can be displayed on a printing control terminal.

FIG. 15 is a diagram illustrating an example of the user interface window that can be displayed on the printing control terminal.

Referring to FIG. 15, the user interface window 1500 may display lists 1510, 1520 regarding the image forming apparatuses that can be connected.

When the location of any one image forming apparatus is moved, the user interface window 1500 may distinguishably display the movement history of the corresponding image forming apparatus 1510. Although the illustrated example exemplifies with a certain icon flickering on the corresponding image forming apparatus 1510, a pop-up window notifying the location change may be displayed together in actual implementation. Further, such operation may be performed within the period set in FIG. 14.

Figure 16:
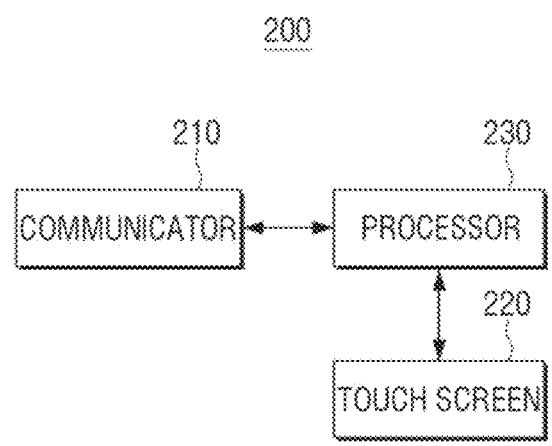
FIG. 16 is a block diagram provided to explain a constitution of a printing control terminal according to an embodiment.

FIG. 16 is a block diagram provided to explain constitution of the printing control terminal according to an embodiment.

The printing control terminal 200 of FIG. 16 may be implemented to be various types of apparatuses such as TV, PC, laptop PC, portable phone, tablet PC, PDA, MP3 player, kiosk, electronic frame, and so on. In an implementation of the portable apparatus type that can be carried around, such as portable phone, tablet PC, PDA, MP3 player, and laptop PC, the printing control terminal may be named as "mobile apparatus", although these and others will be collectively referred to as a "printing control terminal" herein.

Referring to FIG. 16, the printing control terminal 200 may be composed of a communicator 210, a touch screen 220 and a processor 230.

The communicator 210 may be formed to connect the printing control terminal 200 to an external apparatus (not illustrated). The connecting may be performed according to the mobile communication methods (e.g., GSM, UMTS, LTE, WiBRO) as well as LAN and internet network.

Further, the communicator 210 may search the access points that can be connected. Specifically, the communicator 210 may search the access points that can be connected in the ambient area of the printing control terminal 200 (e.g., SSID, BSID) and search RSSI with each access point.

Further, the communicator 210 may receive the access point information from the searched access points. In this case, the access point information may be description information of the access points and may include names of the access points.

The communicator 210 may transmit the location information to the image forming apparatus 100 by using NFC method. In this case, the location information may be the whole access point information received by the printing control terminal 200. Otherwise, the location information may be access point information of the access point having the greatest receiving strength or the determined location itself.

The communicator 210 may transmit the printing data to the image forming apparatus 100 or the management server 300. In this case, the printing data may be data in a printer language such as PS or PCL. When the image forming apparatus 100 supports the direct printing, the printing data may be files such as PDF, XPS, BMP, and JPG.

The communicator 210 may receive the notification regarding the location change of the image forming apparatus 100 from the image forming apparatus 100 or the management server 300.

The touch screen 220 may display icons regarding a plurality of applications previously installed on the printing control terminal 200. Further, the touch screen 220 may receive the selecting of any one among the icons regarding a plurality of displayed applications. In this case, the selected application may be printer driver, scan driver, or printer application to control the functions of the image forming apparatus. When a program is driven in response to the user selecting, the touch screen 220 may receive an input of the document to be printed or the printing option. Further, the touch screen 220 may receive an input of a printing command.

According to an embodiment, the touch screen 220 in which the display function and the input function can be performed in one unit may be used. However, the combination of the display apparatus and an input apparatus such as keyboard or mouse may be implemented.

When the printer application or the printer driver is driving, the touch screen 220 may display a list of the image forming apparatuses that can be connected, and receive the selecting of any one among them. Further, the touch screen 220 may receive the selecting of the document to be printed.

Further, the touch screen 220 may receive a driving command of the management program for the management of the image forming apparatus 100. In this case, the management program may be program to perform searching the access points according to an embodiment and transmitting the determined location information according to the searching to the image forming apparatus 100.

The processor 230 may control each unit within the image control terminal 200. Specifically, the processor 230 may control the touch screen 220 to drive the corresponding program such that the image forming apparatus to perform the printing and the document to be printed can be selected when a driving command of the printing program is inputted. Further, the processor 230 may control the communicator 210 to generate the printing data regarding the selected document by using the driving printing program and transmit the generated printing data to the selected image forming apparatus 100. Thereby, the processor 230 may be named as a controller in view of the fact that each unit within the printing control terminal 200 can be controlled. Further, the processor 230 may be implemented to be CPU or microprocessor.

The processor 230 may control the touch screen 220 to display the informed location change when the location change is notified from the image forming apparatus 100. The processor 230 may determine in advance whether or not the image forming apparatus 100 notifying the location change is default printer of the printing control terminal 200. When the image forming apparatus 100 notifying the location change is default printer, the processor 230 may notify the change immediately or control the touch screen 220 to display the same after the notification when the printer program is driven in order to perform a printing command.

When the image forming apparatus 100 notifying the location change is not default printer, the processor 230 may display the location change at the time point when a user displays the printer list to select a printer.

When the management program is driving, the processor 230 may control the touch screen 220 to display the menu screen for notifying that the printing control terminal 200 and the image forming apparatus 100 have to be arranged near to each other. When the printing control terminal 200 and the image forming apparatus 100 are arranged near to each other, for example, when NFC of the printing control terminal 200 tags with the image forming apparatus 100, the processor 230 may search the access points that can be connected by using the communicator 210.

Further, the processor 230 may receive the access point information from the searched access points, and determine the location of the image forming apparatus 100 by using the received access point information. For example, the access point information may include access point names, and may typically include the location information in which the access points are located. Thus, the processor 230 may extract the access point names from the access point information of the access points that can be connected, and determine the location by using the extracted names.

Meanwhile, when there are a plurality of access points that can be connected, the processor 230 may use only the access point information of the access point having the greatest receiving strength. Further, the processor 230 may first determine the location by using only the access point having the preset information (specifically, indications representing the location information, e.g., floor information, company name, and local area name) among the access points that can be connected.

Further, the processor 230 may control the communicator 210 to transmit the determined location to the image forming apparatus 100. In this case, the determined location may be delivered through NFC tag operation.

The printing control terminal 200 according to the above embodiment may be notified of the location change regarding the image forming apparatus. Thus, a user can prevent the printing from being performed by the unintended image forming apparatus. Further, the printing control terminal 200 may be notified of the moved location. Thus, a user can easily pick up the printed materials, be ensured of the stability regarding the loss of the printed materials or the security of the printed materials, and protect the personal information in the outputted printed materials.

Further, the printing control terminal 200 may identify the image forming apparatus and notify the result to the image forming apparatus, which can enhance the management convenience of the image forming apparatus 100.

Figure 17:
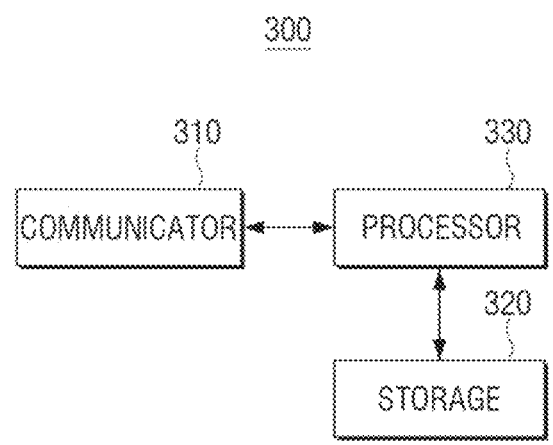
FIG. 17 is a diagram provided to explain a constitution of a management server according to an embodiment.

FIG. 17 is a diagram provided to explain constitution of the management server according to an embodiment.

Referring to FIG. 17, the management server 300 may be composed of a communicator 310, a storage 320 and a processor 330. In this case, the management server 300 may be another server separate from the image forming apparatus, or may be implemented to be web server provided within the image forming apparatus 100. Further, the management server 300 may store the printing data used for the printing of the image forming apparatus 100. Thus, the management server 300 may perform as cloud server, and a plurality of server apparatuses may be implemented instead of one server apparatus in actual implementation.

The communicator 310 may be formed to connect the management server 300 to an external apparatus. The connecting may be performed through USB port and the wireless module as well as LAN and interne network. In this case, the wireless module may be WiFi, WiFi Direct, NFC, and Bluetooth.

Further, the communicator 310 may receive the historic printing information from the image forming apparatus 100. The communicator 310 may be notified of the location information and the location change from the image forming apparatus 100.

The communicator 310 may notify the location change of the image forming apparatus 100 to the printing control terminal 200.

The communicator 310 may receive the printing data from the printing control terminal 200. Meanwhile, the communicator 310 may receive a document instead of the printing data in actual implementation.

The communicator 310 may transmit the printing data to the image forming apparatus 100.

Further, the communicator 310 may receive the information regarding the printing state from the image forming apparatus 100, and notify the received printing state to the printing control terminal 200 transmitting the printing data. In this case, the printing state may include the printing process, error occurrence, the printing completion, and so on.

The storage 320 may store the location information of the image forming apparatus. Further, the storage 320 may store the printing history of each image forming apparatus. The storage 320 may store the account information per user. In this case, the account information may be information regarding printing authorization for a specific image forming apparatus, available printing amount information, and so on.

Further, the storage 320 may sore the received printing data or document.

The processor 330 may control each unit within the management server 300. Specifically, when being notified of the location change from the image forming apparatus 100, the processor 330 may select the printing control terminal having the printing history regarding the corresponding image forming apparatus 100 by using the previously-stored historic printing information. Further, the processor 330 may notify the location change of the image forming apparatus 100 to the selected printing control terminal 200.

When a document is received from the printing control terminal 200, the processor 330 may generate the printing data by using the received document, and transmit the generated printing data to the image forming apparatus 100.

The management server 300 according to the above embodiment may notify the location change to the printing control terminals using the image forming apparatus when the location change of the image forming apparatus is determined. Thus, the printing performed by the unintended image forming apparatus can be prevented. Further, the management server 300 may notify the changed location of the image forming apparatus. Thus, the printed materials can be easily picked up, the stability regarding the loss of the printed materials or the secured printed materials can be obtained, and the personal information in the outputted printed materials can be protected.

Figure 18:
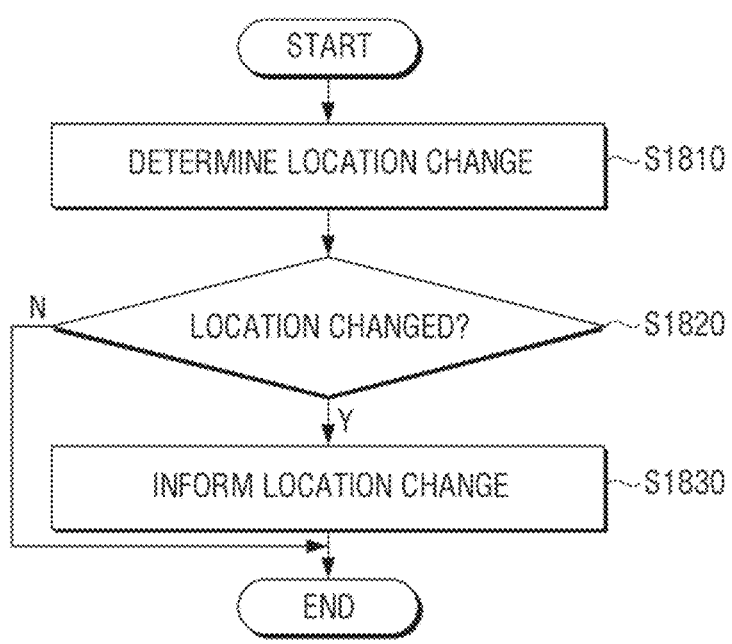
FIG. 18 is a diagram provided to explain a method at an image forming apparatus for notifying a location according to an embodiment.

FIG. 18 is a diagram provided to explain the method for notifying the location in the image forming apparatus according to an embodiment.

Referring to FIG. 18, the location change of the image forming apparatus may be determined by using at least one of the power status of the image forming apparatus and the access point information regarding the access points that can be connected, at S1810. Specifically, when the power status of the image forming apparatus is changed from off state to on state, the location may be determined to have been changed. In this case, the location change of the image forming apparatus may be determined by receiving an input of the current location regarding the image forming apparatus from a user and comparing the inputted location with the previously-stored location.

Alternatively, instead of receiving an input of the location directly, a map may be displayed and the location change of the image forming apparatus may be determined by receiving an input of the location on the map using the previously-stored location and the inputted location.

Further, the access points that can be connected may be searched, and the access point information may be received from the searched access points. When the previously-received access point information is different from the previously-stored access point information, the location change of the image forming apparatus may be determined.

Further, the location change of the image forming apparatus may be determined by receiving an input of the location information regarding the image forming apparatus from the printing control terminal and comparing the previously-stored location with the inputted location information.

When the location of the image forming apparatus is determined to be changed at S1820-Y, the location change may be notified to the printing control terminal at S1830. Specifically, the location change of the image forming apparatus may be notified to all the printing control terminals within the network. Further, the location change may be notified only to the printing control terminals having the printing history. Further, the location change may be notified to the management server such that the management server can notify the location change of the image forming apparatus to the printing control terminals.

Thus, the method for notifying the location in the image forming apparatus according to the embodiment may notify the location change to the printing control terminals using the image forming apparatus when the location change of the image forming apparatus is determined. Thus, the printing performed by the unintended image forming apparatus can be prevented. Further, because the location of the location-moved image forming apparatus is notified, the printed materials can be easily picked up, the stability regarding the loss of the printed materials and the secured printed materials can be obtained, and the personal information in the outputted printed materials can be protected. The location notifying method of FIG. 18 may be performed on the image forming apparatus having the constitution of FIGS. 3 and 4, or performed on another image forming apparatus having different constitution.

Further, the location notifying method in the image forming apparatus as described above may be implemented to be at least one program to perform the location information method. Further, the implementing program may be stored on non-transitory computer readable recording medium.

A non-transitory computer readable recording medium refers to a medium which store data semi-permanently and can be read by apparatuses, rather than a medium storing data temporarily such as register, cache, or memory. Specifically, the above various applications or programs may be stored and provided in non-transitory computer readable recording medium such as CD, DVD, hard disk, Blu-ray disk, USB, memory card, or ROM.

Figure 19:
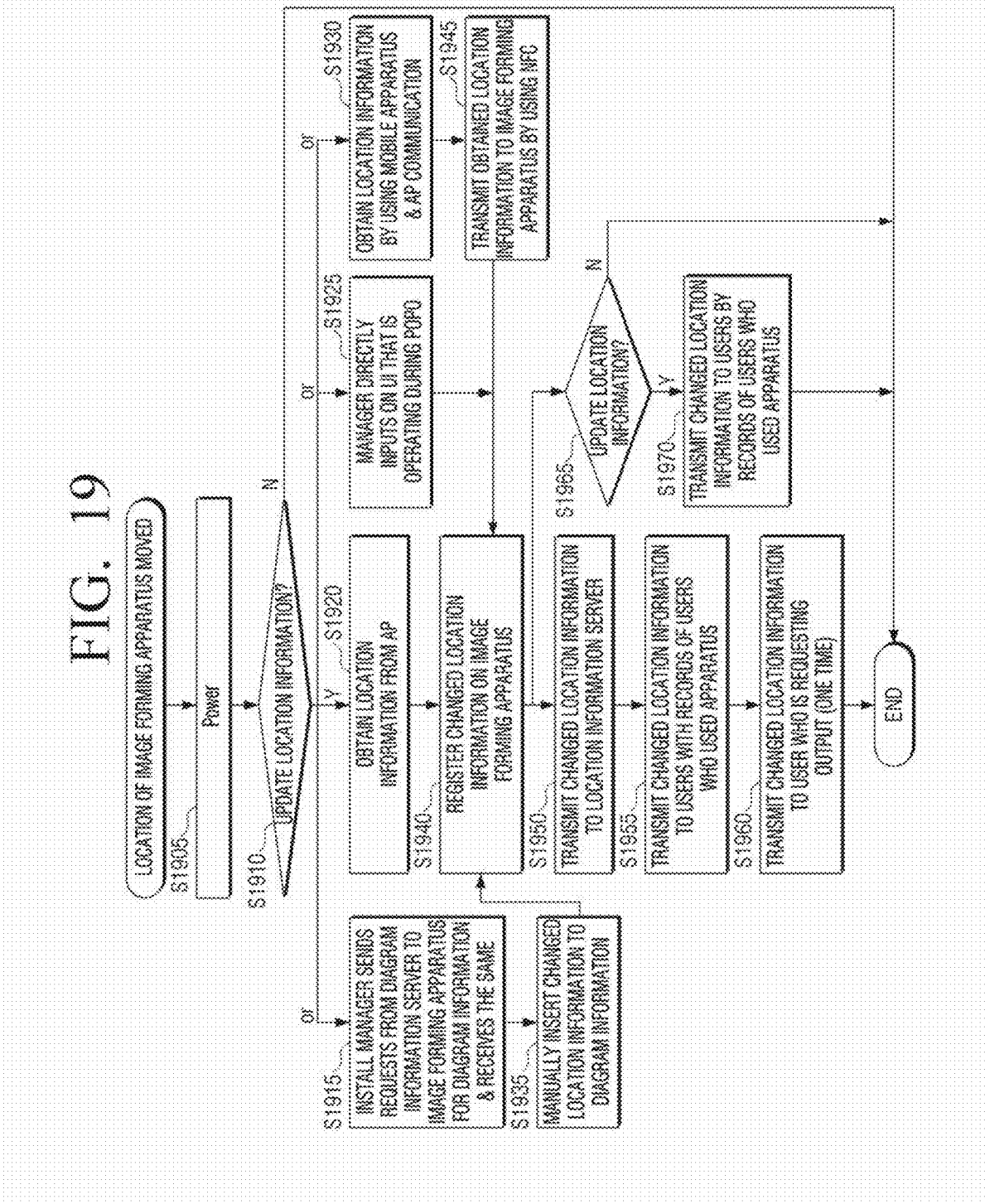
FIG. 19 is a diagram provided to explain a method at an image forming apparatus for notifying a location according to an embodiment.

FIG. 19 is a diagram provided to explain the method for notifying the location of the image forming apparatus according to another embodiment.

Referring to FIG. 19, when the power status of the image forming apparatus is changed from off state to on state at S1905, it may be determined whether or not it is necessary to update the location of the image forming apparatus at S1910. Specifically, the need for updating may be determined by confirming the user settings regarding whether or not to perform the location updating when the power is on.

When it is not necessary to perform the location updating at S1910-N, the basic UI may be displayed without another operation.

When it is necessary to perform the updating at S1910-Y, the location information may be updated according to the function of the image forming apparatus 100 and a previously-selected method.

Specifically, when a manual update is previously set, the image forming apparatus 100 may display the map received from the management server 300 at S1915, and receive the selecting of the location regarding the image forming apparatus on the map from a user, at S1935.

When another manual update is previously set, the image forming apparatus 100 may display UI to receive an input of the location information and receive an input of the location regarding the image forming apparatus 100 on the displayed UI, at S1925.

Meanwhile, when an automatic update is previously set and when the wireless communication module is provided on the image forming apparatus 100, the image forming apparatus 100 may search the access points that can be connected, receive the access point information from the searched access points, and determine the location by using the received access point information at S1920.

Meanwhile, when an automatic update is previously set but when the image forming apparatus 100 does not include WiFi, the image forming apparatus 100 may be notified of the location information obtained at the printing control terminal 200 at S1930 and S1945.

When the current location of the image forming apparatus is confirmed according to the above method, the confirmed location may be registered as location of the image forming apparatus, at S1940.

At S1950, the image forming apparatus 100 may notify the current location to the management server 300. In this case, when the previously-stored location is different from the informed location, the management server 300 may notify the location change of the image forming apparatus 100 to the printing control terminal 200 having the printing history regarding the corresponding image forming apparatus 100, at S1955.

When the previously-stored location information is different from the new location at S1965, i.e., when the location change of the image forming apparatus is determined at S1965-Y, the location change of the image forming apparatus may be uniformly notified to the printing control terminals having the history of using the image forming apparatus, at S1970.

Further, when a printing request is received from the printing control terminal 200 after the location change, the image forming apparatus 100 may additionally notify the location change of the image forming apparatus 100 according to the printing history after the location change at S1960.

Thus, the location notifying method of the image forming apparatus according to the embodiment may notify the location change to the printing control terminal using the image forming apparatus when the movement of the image forming apparatus is determined. Thus, the printing performed by the unintended image forming apparatus can be prevented. Further, because the location of the image forming apparatus is notified, the printed materials can be easily picked up, the stability regarding the loss of the printed materials or the secured printed materials can be obtained, and the personal information in the outputted printed materials can be protected. The location notifying method of FIG. 19 may be performed on the image forming apparatus having the constitution of FIGS. 3 and 4, or on another image forming apparatus having different constitution.

Further, the location notifying method of the image forming apparatus described above may be implemented to be at least one program to perform the location notifying method, and such implementing program may be stored in non-transitory computer readable medium.

Figure 20:
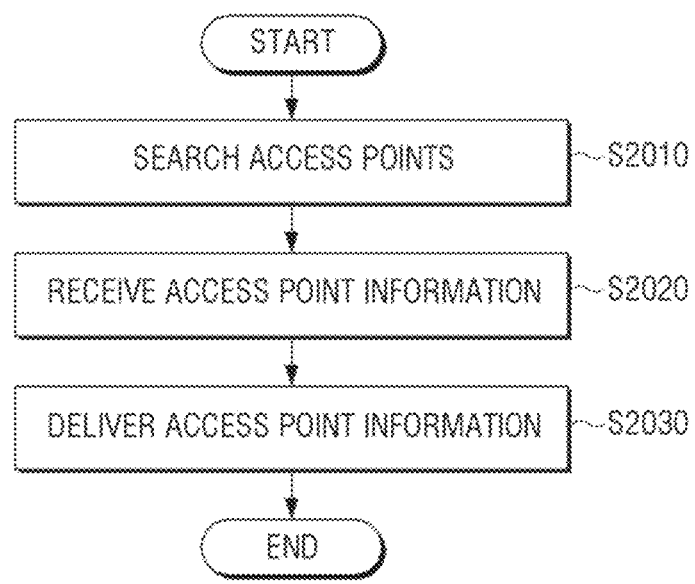
FIG. 20 is a diagram provided to explain a method at a printing control terminal for measuring a location according to an embodiment.

FIG. 20 is a diagram provided to explain a method for measuring the location in the printing control terminal according to an embodiment.

Referring to FIG. 20, the printing control terminal 200 may search the access points that can be connected, at S2010.

The access point information may be received from the searched access points at S2020.

At S2030, the received access point information may be transmitted to the image forming apparatus 100. Meanwhile, in actual implementation the location of the image forming apparatus may be determined by using the access point information received from the printing control terminal 200, and the determined location may be transmitted only to the image forming apparatus 100. Further, the access point information having the preset information among the received access point information may be transmitted only to the image forming apparatus 100, or the access point information of the access point having the greatest connecting strength may be only transmitted to the image forming apparatus 100.

Thus, the location measuring method in the printing control terminal according to an embodiment may provide the information requested for confirming the location of the image forming apparatus to the image forming apparatus. Thus, the management convenience of the image forming apparatus 100 can be enhanced. The location measuring method of the printing control terminal in FIG. 20 may be performed on the printing control terminal having the constitution of FIG. 16, or performed on another printing control terminal having different constitution.

Further, the location measuring method at the printing control terminal described above may be implemented to be at least one program to perform the printing control method, and such implementing program may be stored in non-transitory computer readable recording medium.

Figure 21:
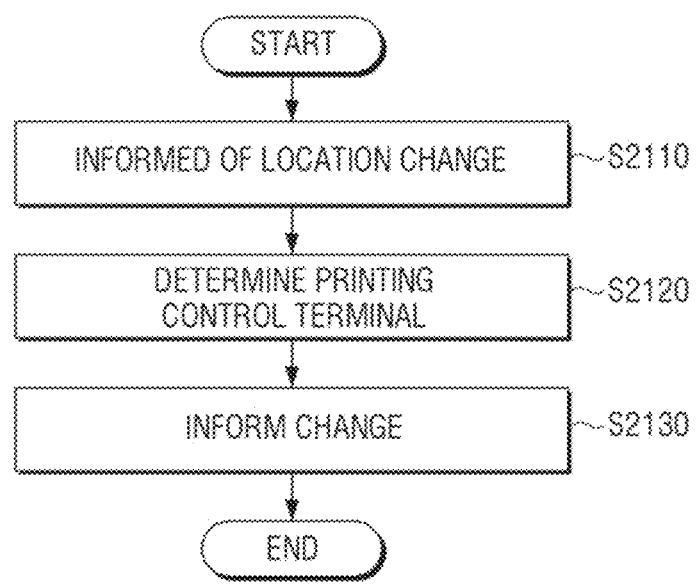
FIG. 21 is a diagram provided to explain a method at a management server for notifying a location according to an embodiment.

FIG. 21 is a diagram provided to explain the method for notifying the location in the management server according to an embodiment.

Referring to FIG. 21, the location change of the image forming apparatus 100 may be notified from the image forming apparatus, at S2110.

At S2120, the printing control terminal 200 to be notified of the location change regarding the image forming apparatus 100 may be determined. Specifically, the management server 300 may determine the printing control terminal 200 having the printing history regarding the image forming apparatus 100 whose location has been moved, by using the previously-stored historic printing information.

At S2130, the location change of the image forming apparatus may be notified to the determined printing control terminal 200.

Thus, the location notifying method in the management server according to the embodiment may notify the location change to the printing control terminal using the image forming apparatus when the movement of the image forming apparatus is determined. Thus, the printing performed by the unintended image forming apparatus can be prevented. Further, because the moved location may be easily confirmed, the printed materials can be easily picked up, the stability regarding the loss of the printed materials or the secured printed materials can be obtained, and the personal information in the outputted printed materials can be protected. The location notifying method in the management server of FIG. 21 may be performed on the management server having the constitution of FIG. 17, or on another management server having the different constitution.

Further, the location notifying method in the management server described above may be implemented to be at least one program to perform the location notifying method, and such implementing program may be stored in non-transitory computer readable recording medium.

Therefore, each block according to an embodiment may be implemented as computer-recordable codes on the non-transitory computer readable recording medium. The non-transitory computer readable recording medium may be apparatus to store the data that can be read by a computer system.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

What is claimed is:

1. An image forming apparatus, comprising:
    an image former to perform a printing operation to print printing data received by the image forming apparatus from one of a printing control terminal remotely located from the image forming apparatus and a server remotely located from the image forming apparatus;
    a memory; and
    at least one processor to:
        in response to a power status of the image forming apparatus changing from an off state to an on state, obtain a current location of the image forming apparatus, and determine a location change of the image forming apparatus has occurred when the current location of the image forming apparatus is different from a previous location of the image forming apparatus, the previous location having been stored in the memory at a time before the power status of the image forming apparatus was changed from the off state to the on state, and
        perform a control to transmit changed location information indicating the location change of the image forming apparatus has occurred to at least one of the printing control terminal or the server, and
        control the image former to print the received print data or to cancel the printing operation according to a command received based on the location change of the image forming apparatus indicated in the changed location information from one of the printing control terminal and the server which has received the changed location information.

2. The image forming apparatus of claim 1, further comprising:
    a user interface to obtain the current location of the image forming apparatus after the power status of the image forming apparatus is changed from the off state to the on state,
    wherein the at least one processor determines whether the location change of the image forming apparatus has occurred by using the current location obtained by the user interface and the previous location.

3. The image forming apparatus of claim 1, further comprising:
    a display to display map information of a space in which the image forming apparatus is located after the power status of the image forming apparatus is changed from the off state to the on state; and
    a user interface to set an area where the image forming apparatus is located based on the displayed map information,
    wherein the at least one processor determines whether the location change of the image forming apparatus has occurred by comparing the set area with a previously-stored area.

4. The image forming apparatus of claim 1, wherein
    the at least one processor is to search access points to which the image forming apparatus is connectable and to receive access point information from the searched access points, and
    the at least one processor determines whether the location change of the image forming apparatus has occurred by further using the received access point information.

5. The image forming apparatus of claim 4, wherein
    the access point information comprises access point names of the access points,
    the at least one processor is to obtain the current location of the image forming apparatus based on the access point names.

6. The image forming apparatus of claim 5, wherein
    the at least one processor is to compare signal strengths regarding the access points when the access point information is received respectively from the access points, and to obtain the current location of the image forming apparatus by using access point information regarding an access point, among the access points, having the greatest signal strength based on the comparison.

7. The image forming apparatus of claim 6, wherein, when the access point information is received respectively from the access points, the at least one processor is to compare the signal strengths regarding the access points in which the access point information includes preset information.

8. The image forming apparatus of claim 1, wherein
the printing control terminal is a mobile apparatus,
the image forming apparatus receives, from the mobile apparatus, access point information of an access point having the greatest signal strength among access points to which the image forming apparatus is connectable,
the at least one processor is to obtain the current location of the image forming apparatus by using the received access point information, and
the at least one processor further determines the location change of the image forming apparatus has occurred when the received access point information is different from previous access point information stored in the memory.

9. The image forming apparatus of claim 1, wherein the memory is to store address information of the printing control terminal having a printing history with the image forming apparatus.

10. The image forming apparatus of claim 9, wherein, when the at least one processor determines the location change of the image forming apparatus has occurred, the at least one processor performs the control to transmit the changed location information to the printing control terminal if the address information of the printing control terminal is stored in the storage.

11. The image forming apparatus of claim 1, wherein the printing data is received from the one of the server and the printing control terminal after the location change of the image forming apparatus is determined.

12. The image forming apparatus of claim 11, wherein the at least one processor is to
suspend the printing operation in response to determining the location change of the image forming apparatus has occurred, and
after performing the control to transmit the changed location information, control the image former to print the received printing data in response to the command being received from the one of the server and the printing control terminal, the command indicating the image forming apparatus is to continue the printing operation to print the received print data.

13. The image forming apparatus of claim 11, wherein the at least one processor is to
determine whether the printing control terminal has a printing history with the image forming apparatus subsequent to the determination that the location change of the image forming apparatus has occurred, and
perform the control to transmit the changed location information to the printing control terminal in response to the at least one processor determining that the printing control terminal does not have the printing history.

14. The image forming apparatus of claim 1, wherein, when an apparatus information request is received from the printing control terminal or the server after the image forming apparatus determines the location change of the image forming apparatus has occurred, the at least one processor is to transmit apparatus information together with the changed location information to the printing control terminal or the server that transmitted the apparatus information request.

15. A method, comprising:
by an image forming apparatus:
in response to a power status of the image forming apparatus changing from an off state to an on state, obtaining a current location of the image forming apparatus, and determining a location change of the image forming apparatus has occurred when the current location of the image forming apparatus is different from a previous location of the image forming apparatus, the previous location having been stored in a memory of the image forming apparatus at a time before the power status of the image forming apparatus was changed from the off state to the on state,
receiving printing data, from one of a server remotely located from the image forming apparatus and a printing control terminal remotely located from the image forming apparatus, for a printing operation by the image forming apparatus,
transmitting changed location information indicating the location change of the image forming apparatus has occurred to at least one of the printing control terminal or the server,
suspending the printing operation in response to determining the location change of the image forming apparatus has occurred, and
printing the received print data after the suspending or cancelling the printing operation after the suspending, according to a command received based on the location change of the image forming apparatus indicated in the changed location information from the at least one of the printing control terminal or the server which has received the changed location information.

16. The method of claim 15, wherein the determining the location change further comprises:
receiving an input of the current location of the image forming apparatus after the power status of the image forming apparatus is changed from the off state to the on state, and
determining whether the location change of the image forming apparatus has occurred by using the input current location and the previous location.

17. The method of claim 15, further comprising:
by the image forming apparatus:
searching access points to which the image forming apparatus is connectable, and
receiving access point information from the searched access points,
wherein the determining the location change comprises determining whether the location change of the image forming apparatus has occurred by further using the received access point information and previous access point information stored in the memory.

18. The method of claim 17, wherein
the access point information comprises access point names of the access points,
the obtaining the current location of the image forming apparatus is based on the access point names, and
determining the location change of the image forming apparatus has occurred comprises comparing the current location with the previous location.

19. An image forming apparatus, comprising:
a communication interface to receive printing data from one of a server remotely located from the image forming apparatus and a printing control terminal remotely located from the image forming apparatus, and to receive access point information from at least one access point to which the image forming apparatus is wirelessly connectable;
an image former to perform a printing operation to print the printing data;
a memory to store history information of the printing control terminal regarding one or more printing operations requested by the printing control terminal with respect to the image forming apparatus; and
at least one processor to:
  in response to a power status of the image forming apparatus changing from an off state to an on state, obtain a current location of the image forming apparatus based on the received access point information,
  determine a location change of the image forming apparatus has occurred when the current location of the image forming apparatus is different from a previous location of the image forming apparatus, the previous location having been stored in the memory at a time before the power status of the image forming apparatus was changed from the off state to the on state,
  in response to the communication interface receiving the print data from the one of the server and the printing control terminal control, control the image former to automatically print the print data when the history information indicates the printing control terminal has requested the image forming apparatus to perform at least one other printing operation subsequent to the power status of the image forming apparatus being changed from the off state to the on state,
  in response to the determination the location change of the image forming apparatus has occurred and the communication interface receiving the print data from the one of the server and the printing control terminal control, control the image former to suspend the printing operation before printing the print data when the history information indicates the printing control terminal has not requested the image forming apparatus to perform at least one other printing operation subsequent to the power status of the image forming apparatus being changed from the off state to the on state, control the communication interface to transmit changed location information indicating the location change of the image forming apparatus has occurred to the at least one of the printing control terminal or the server, and control the image former to print the received print data or to cancel the printing operation according to a command received based on the location change of the image forming apparatus indicated in the changed location information from the at least one of the printing control terminal or the server which has received the changed location information.

* * * * *